United States Patent
Jeon et al.

(10) Patent No.: US 12,282,398 B2
(45) Date of Patent: Apr. 22, 2025

(54) PCIe DEVICE AND COMPUTING SYSTEM INCLUDING THE SAME

(71) Applicant: SK hynix Inc., Gyeonggi-do (KR)

(72) Inventors: Yong Tae Jeon, Gyeonggi-do (KR); Dong Jin Seong, Gyeonggi-do (KR); Jong Heon Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 270 days.

(21) Appl. No.: 17/953,881

(22) Filed: Sep. 27, 2022

(65) Prior Publication Data

US 2023/0315591 A1 Oct. 5, 2023

(30) Foreign Application Priority Data

Mar. 29, 2022 (KR) .......... 10-2022-0039076

(51) Int. Cl.
*G06F 11/20* (2006.01)
*G06F 13/42* (2006.01)

(52) U.S. Cl.
CPC ...... *G06F 11/2007* (2013.01); *G06F 13/4282* (2013.01); *G06F 2213/0026* (2013.01)

(58) Field of Classification Search
CPC ............. G06F 11/2007; G06F 13/4282; G06F 2213/0026
See application file for complete search history.

(56) References Cited

U.S. PATENT DOCUMENTS

| | | | |
|---|---|---|---|
| 7,756,123 B1 * | 7/2010 | Huang | G06F 13/4022 370/359 |
| 8,645,746 B2 * | 2/2014 | Buckland | G06F 13/4068 714/4.11 |
| 9,645,965 B2 | 5/2017 | Das Sharma et al. | |
| 10,469,291 B2 | 11/2019 | Berke et al. | |
| 2005/0240696 A1 * | 10/2005 | Hasegawa | G06F 13/4291 710/305 |
| 2009/0006889 A1 * | 1/2009 | Holdaway | G06F 11/2007 714/E11.079 |
| 2011/0179231 A1 * | 7/2011 | Roush | G06F 11/1425 711/147 |
| 2013/0290772 A1 * | 10/2013 | Ballard | G06F 11/20 714/E11.073 |
| 2016/0041935 A1 * | 2/2016 | Kinjo | H04L 5/0091 710/116 |
| 2016/0283299 A1 * | 9/2016 | Zerdoum | G06F 12/0646 |

FOREIGN PATENT DOCUMENTS

KR   10-2018-0037783 A   4/2018

* cited by examiner

*Primary Examiner* — Henry Tsai
*Assistant Examiner* — John B Roche
(74) *Attorney, Agent, or Firm* — IP & T GROUP LLP

(57) ABSTRACT

A Peripheral Component Interconnect express (PCIe) device includes: a plurality of ports forming a plurality of lanes; and a link controller configured to set a link including the plurality of lanes to allocate non-sequential lane numbers to lanes adjacent to each other among the plurality of lanes.

20 Claims, 17 Drawing Sheets

PCIe DEVICE AND COMPUTING SYSTEM INCLUDING THE SAME

CROSS-REFERENCE TO RELATED APPLICATION

The present application claims priority under 35 U.S.C. § 119 (a) to Korean patent application number 10-2022-0039076, filed on Mar. 29, 2022, the entire disclosure of which is incorporated herein by reference.

BACKGROUND

Field of Invention

The present disclosure generally relates to an electronic device, and more particularly, to a Peripheral Component Interconnect express (PCIe) device and a computing system including the same.

Description of Related Art

Peripheral component interconnect (PCI) defines a bus protocol used to connect input/output devices to a host device. PCI express (PCIe) is used to define a physical communication layer as a high speed serial interface while having a programming concept defined in the PCI standard.

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Various embodiments of the present disclosure provide a Peripheral Component Interconnect express (PCIe) device for allocating lane numbers such that discontinuous lane numbers are allocated to lanes located adjacent to each other in a link setting operation, and a computing system including the PCIe device.

In accordance with an aspect of the present disclosure, there is provided a PCIe device including: a plurality of ports forming a plurality of lanes; and a link controller configured to set a link including the plurality of lanes to allocate non-sequential lane numbers to lanes adjacent to each other among the plurality of lanes.

In accordance with another aspect of the present disclosure, there is provided a computing system including: a link including a plurality of lanes; a first Peripheral Component Interconnect express (PCIe) device including a plurality of downstream ports; and a second PCIe device including a plurality of upstream ports which form, together with the plurality of downstream ports, the plurality of lanes, and configured to transmit/receive data to/from the first PCIe device through the link, wherein the first PCIe device is configured to set the link to allocate non-sequential lane numbers to the plurality of lanes.

In accordance with still another aspect of the present disclosure, there is provided a computing system including: a link including a plurality of lanes; a first Peripheral Component Interconnect express (PCIe) device including a plurality of downstream ports; and a second PCIe device including a plurality of upstream ports which form, together with the plurality of downstream ports, the plurality of lanes, and configured to transmit/receive data to/from the first PCIe device through the link, wherein the first PCIe device is configured to provide the second PCIe evice with sequential lane numbers allocated to the plurality of lanes, and wherein the second PCIe device is further configured to provide the first PCIe device with non-sequential lane numbers allocated to the plurality of lanes.

In accordance with still another aspect of the present disclosure, there is provided an operating method of a device including: proposing, to an external device, non-sequential numbers for respective normal lanes; allocating the non-sequential numbers to the respective normal lanes when receiving a positive response from the external device, and sequential numbers to the respective normal lanes otherwise; and communicating with the external device through the normal lanes according to the sequential or non-sequential numbers allocated to the respective normal lanes.

BRIEF DESCRIPTION OF THE DRAWINGS

Embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
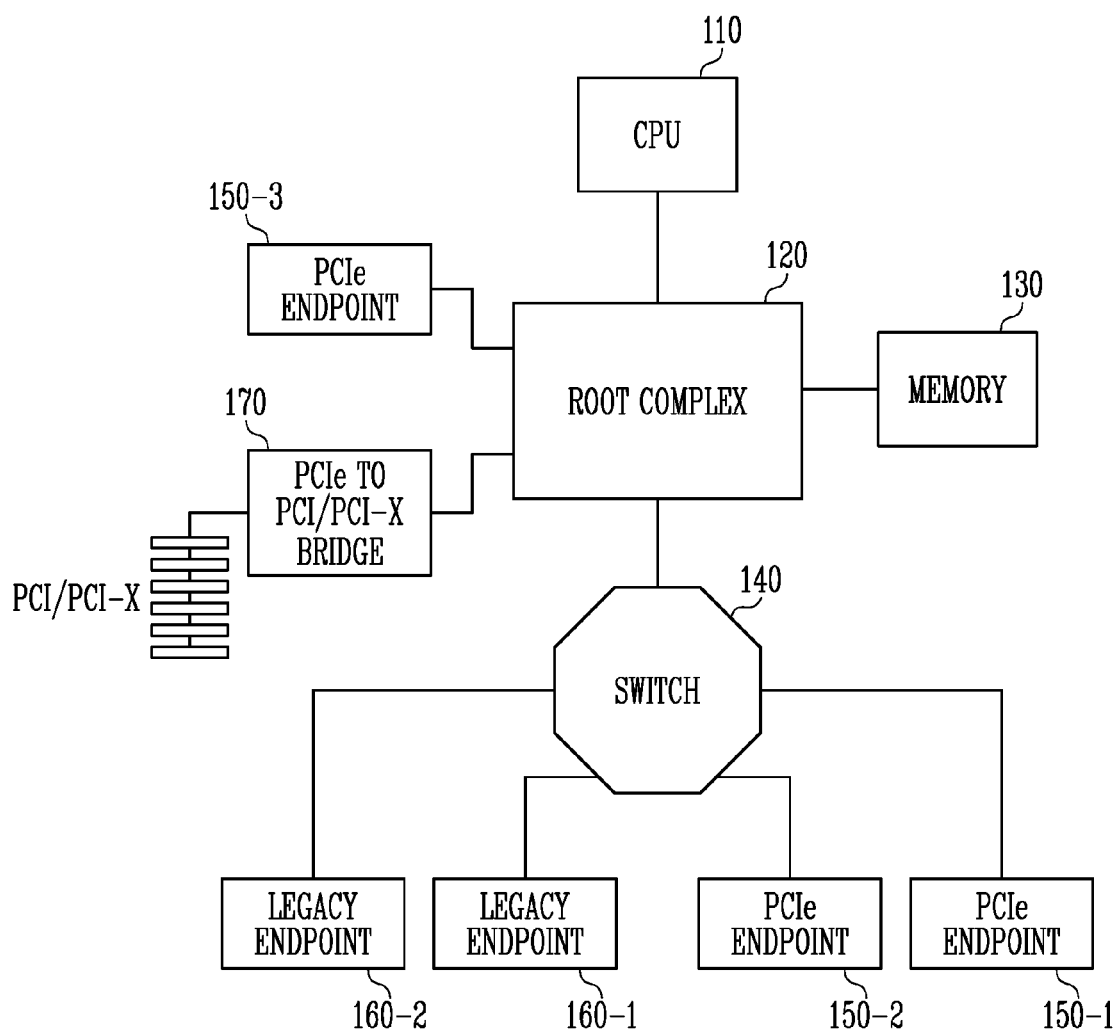
FIG. 1 is a diagram illustrating a computing system in accordance with an embodiment of the present disclosure.

FIG. 1 is a diagram illustrating a computing system in accordance with an embodiment of the present disclosure.

Referring to FIG. 1, a computing system 100 may include a CPU 110, a root complex 120, a memory 130, a switch 140, peripheral component interconnect express (PCIe) endpoints 150_1 to 150_3, legacy endpoints 160_1 and 160_2, and a PCIe bridge 170.

The computing system 100 may be an electronic device which supports communication using a PCIe interface. The computing system 100 may be a PC, a laptop computer, or a mobile computing device, and include an expansion card, an expansion board, an adaptor card, an add-in card, or an accessary card. Also, the computing system 100 may include a printed circuit board (PCB) which can be inserted into an electrical connector or an expansion slot on a mother board of the computing system 100 to provide an additional function to the computing system 100 through an expansion bus. Also, the computing system 100 may include a storage device such as a solid state drive (SSD), and include a graphic card, a network card, a USB card, or the like.

The CPU 110 may be electrically connected to each component of the computing system 100, and control each operation of the computing system 100. Specifically, the CPU 110 may control components of hardware or software, connected to the CPU 110, by driving an operating system or an application program, and perform various data processing and calculations. Also, the CPU 110 may execute software or an application, which is used to control an operation of the computing system 100.

The root complex 120 may be a root hub, a controller hub, or a root controller in a PCIe interconnect architecture. For example, the root complex 120 may include a chipset, a memory controller hub (MCH), a north bridge, an interconnect controller hub (ICH), a south bridge, and a root controller/hub. Also, the root complex 120 may connect the CPU 110 and the memory 130 to an input/output (I/O) hierarchy. The root complex 120 may support a peer-to-peer (P2P) routing. The root complex 120 may include at least one host bridge and at least one root port. The root complex 120 may support at least one PCIe port.

The memory 130 may store data, commands, or a program code, necessary for an operation of the computing system 100. In an embodiment, the memory 130 may store program codes for executing one or more operating systems (OSs) and one or more virtual machines (VMs) and program codes for executing a virtualization intermediary (VI) for managing the VMs. Also, the memory 130 may be implemented as a volatile memory device such as a DRAM or an SRAM.

The switch 140 may route a packet or message upstream or downstream. Specifically, the switch 140 may route the packet or message upstream to a layer toward the root complex 120 from a PCIe endpoint (e.g., 150_1). Also, the switch 140 may route the packet or message downstream to a layer toward a PCIe endpoint (e.g., 150_2) from the root complex 120.

The switch 140 may be designated as a logic assembly of a plurality of virtual PCI-to-PCI bridge devices. A device which may be connected to the switch 140 may include an arbitrary internal or external device or a component, which is connected to electronic systems such as a network interface controller (NIC), an add-in card, an audio processor, a network processor, a hard-drive, a storage device, a CD/DVD ROM, a monitor, a printer, a mouse, a keyboard, a router, a mobile storage device, a firewire device, a universal serial bus (USB), a scanner, and other input/output devices. Although not shown in detail, the device may include a PCIe-to-PCI/PCI-X bridge supporting a PCI device of a legacy version or another version.

In an embodiment, the root complex 120 may be connected to an endpoint. The endpoint may represent a type of function which may become a requester or completer of a PCIe transaction. The endpoint may be classified into a legacy endpoint and a PCIe endpoint.

The PCIe endpoints 150_1 to 150_3 and the legacy endpoints 160_1 and 160_2 may serve as the requester or completer of the PCIe transaction. A transaction layer packet (TLP) communicated by the PCIe endpoints 150_1 to 150_3 and the legacy endpoints 160_1 and 160_2 may provide a configuration space header. Also, the PCIe endpoints 150_1 to 150_3 and the legacy endpoints 160_1 and 160_2 may provide a configuration request as a completer. In a specific condition, a transaction layer packet (TLP) communicated by the PCIe endpoints 150_1 to 150_3 and the legacy endpoints 160_1 and 160_2 must provide a configuration space header. Also, the PCIe endpoints 150_1 to 150_3 and the legacy endpoints 160_1 and 160_2 must provide a configuration request as a completer.

The PCIe endpoints 150_1 to 150_3 and the legacy endpoints 160_1 and 160_2 may be divided according to the size of a memory transaction. For example, when a memory transaction exceeding 4 GB is possible, the endpoint may be the PCIe endpoints 150_1 to 150_3. When a memory transaction exceeding 4 GB is impossible, the endpoint may be the legacy endpoints 160_1 and 160_2. The PCIe endpoints 150_1 to 150_3 must not generate any input/output request, but the legacy endpoints 160_1 and 160_2 may provide or generate an input/output request. In addition, the PCIe end point 150_3 may communicate a TLP with the root complex 120. In addition, PCI/PCI-X may communicate a TLP with the root complex 120 through the PCIe bridge 170. The PCIe endpoints 150_1 and 150_2 or the legacy endpoints 160_1 and 160_2 may communicate a TLP with the switch 140.

The PCIe endpoints 150_1 to 150_3 may be a function having a type 00h configuration space header. The PCIe endpoints 150_1 to 150_3 may support a configuration request as a completer. A PCIe compatible software driver and an application program may be made such that any lock semantic is not used when the PCIe endpoints 150_1 to 150_3 are accessed. The PCIe endpoints 150_1 to 150_3 operating as the requester of the memory transaction may generate an address greater than 4 GB. When an interrupt resource is requested, the PCIe endpoints 150_1 to 150_3 may be necessary to support message signaled interrupts (MSI), MSI-X, or both of them. When the MSI is implemented, the PCIe endpoints 150_1 to 150_3 may support a 64-bit message address version of an MSI functional structure. A minimum memory address range requested by a base address register may be 128 bytes. The PCIe endpoints 150_1 to 150_3 may exist in one of hierarchy domains started in the root complex 120.

The legacy endpoints 160_1 and 160_2 may be a function having a type 00h configuration space header. The legacy endpoints 160_1 and 160_2 may support a configuration request as a completer. The legacy endpoints 160_1 and 160_2 may support an I/O request as the completer. The legacy endpoints 160_1 and 160_2 may accept an I/O request for one or both of positions 80*h* and 84*h*, regardless of the I/O decode configuration of a corresponding endpoint. The legacy endpoints 160_1 and 160_2 may generate an I/O request. The legacy endpoints 160_1 and 160_2 may include extended configuration space capabilities. The legacy endpoints 160_1 and 160_2 operating as the requester of the memory transaction may not generate an address having 4 GB or more. When an interrupt resource is requested, the legacy endpoints 160_1 and 160_2 are necessary to support the MSI, the MSI-X, or both of them. When the MSI is implemented, the legacy endpoints 160_1 and 160_2 may support a 32-bit or 64-bit message address version of the MSI functional structure. The legacy endpoints 160_1 and 160_2 may support 32-bit address specification with respect to the base address register which requests a memory resource. The legacy endpoints 160_1 and 160_2 may exist in one of the hierarchy domains originated in the root complex 120.

Figure 2:
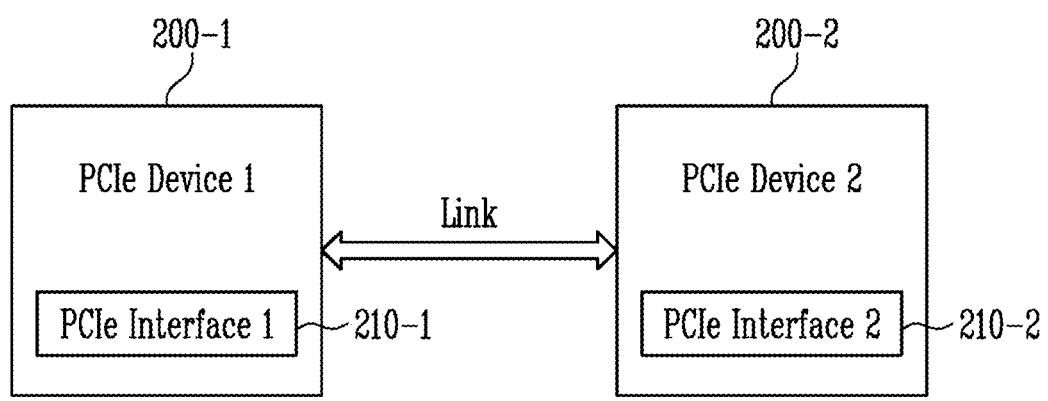
FIG. 2 is a diagram illustrating a Peripheral Component Interconnect express (PCIe) device in accordance with an embodiment of the present disclosure.

FIG. 2 is a diagram illustrating a PCIe device in accordance with an embodiment of the present disclosure.

Referring to FIG. 2, the PCIe device may include a PCIe interface, and device which supports be an electronic transmission/reception using the PCIe interface. For example, a first PCIe device 200-1 or a second PCIe device 200-2 may be one of the root complex 120, the switch 140, the PCIe endpoints 150_1 to 150_3, the legacy endpoints 160_1 and 160_2, and the PCIe bridge 170, which are shown in FIG. 1.

Also, the first PCIe device 200-1 or the second PCIe device 200-2 may perform communication by using a first PCIe interface 210-1 or a second PCIe interface 210-2. Specifically, the first PCIe device 200-1 may convert data to be transmitted from the second PCIe device 200-2 into a protocol suitable for communication by using the first PCIe interface 210-1. In addition, the first PCIe device 200-1 and the second PCIe device 200-2 may form a link. The first PCIe device 200-1 and the second PCIe device 200-2 may communicate with each other through the formed link. For example, the first PCIe device 200-1 or the second PCIe device 200-2 may transmit/receive a packet through the link.

Figure 3:
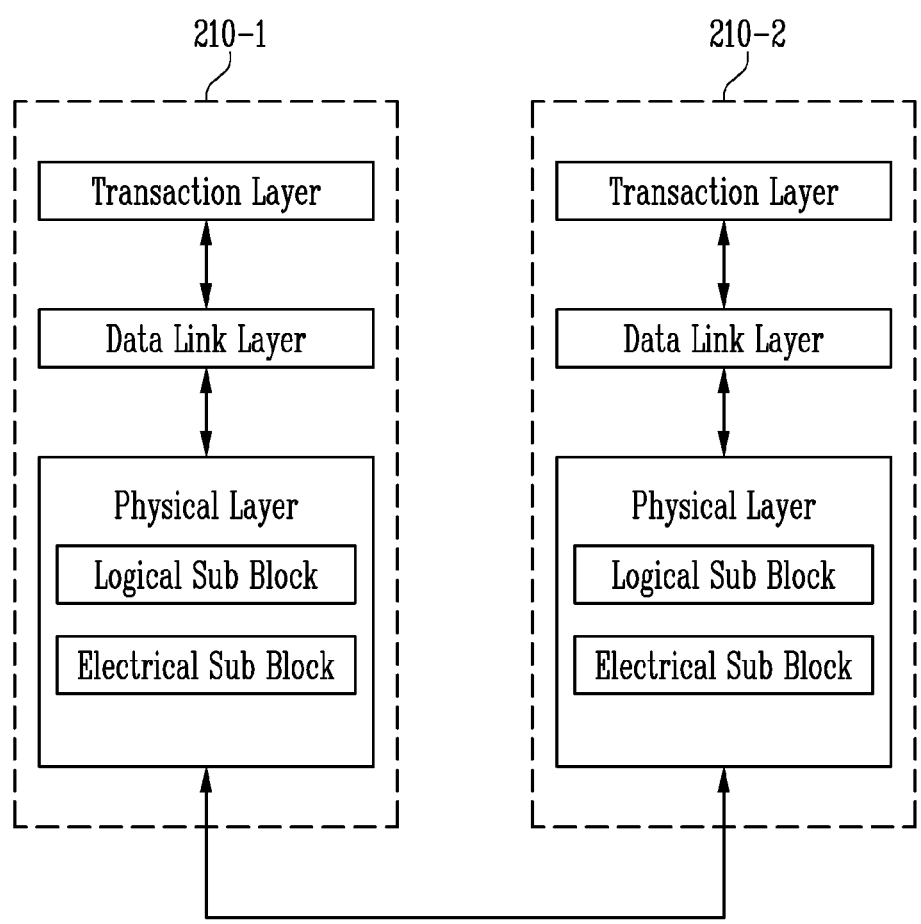
FIG. 3 is a diagram illustrating a PCIe interface in accordance with an embodiment of the present disclosure.

FIG. 3 is a diagram illustrating a PCIe interface in accordance with an embodiment of the present disclosure.

Referring to FIG. 3, a first PCIe interface 210-1 and a second PCIe interface 210-2 are illustrated. The first PCIe interface 210-1 and the second PCIe interface 210-2 may be formed in the same structure, and therefore, the first PCIe interface 210-1 will be mainly described.

PCIe layers included in the first PCIe interface 210-1 may include three discrete logical layers. For example, the first PCIe interface 210-1 may include a transaction layer, a data link layer, and a physical layer. Each of the layers may include two sections. One section may process outbound (or transmitted) information, and the other may process inbound (or received) information. Also, the first PCIe interface 210-1 may use packets to communicate information between other PCIe interfaces.

An upper layer in the structure of the PCIe interface may be the transaction layer. The transaction layer may assemble and disassemble transaction layer packets (TLPs). Also, the transaction layer may implement a split transaction, i.e., a transaction which allows other traffic to be transferred through a link while a target system assembles data necessary for a response. In an embodiment, four transaction address spaces may include a configuration address space, a memory address space, an input/output address space, and a message address space. A memory space transaction may include one or more of write and read requests to transfer data to/from a memory-mapped location. In an embodiment, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe devices.

The transaction layer may store link configuration information, etc. Also, the transaction layer may generate a TLP, or convert a received TLP into a payload or status information.

A middle layer in the structure of the PCIe interface may be the data link layer, and the data link layer may perform a function of an intermediate stage between the transaction layer and the physical layer. A major function of the data link layer may be link management and data integrity including error detection and error correction. Specifically, a transmission side of the data link layer may accept TLPs assembled in the transaction layer, provide a data protection code, or calculate a TLP sequence number. Also, the transmission side of the data link layer may transmit the data protection code and the TLP sequence number to the physical layer such that the data protection code and the TLP sequence number are transmitted through the link. A reception side of the data link layer may check the data integrity of TLPs received from the physical layer, and transmit the TLPs to the transaction layer to perform additional processing.

The physical layer may include all circuitry for an interface operation. The all circuitry may include a driver, an input buffer, a series-parallel conversion circuit, a parallel-series conversion circuit, phase locked loops (PLLs), and an impedance matching circuit.

Also, the physical layer may include a logical sub-block and an electrical sub-block, which physically transmit a packet to an external PCIe device. The logical sub-block may perform a role necessary for a 'digital' function of the physical layer. In relation to this, the logical sub-block may include a transmission section for preparing sending information to be transmitted by the physical sub-block and a reception section for identifying and preparing information received before the received information is transferred to the data link layer. The physical layer may include a transmitter and a receiver. The transmitter may receive a symbol transmitted to an external device as the transmitter is serialized by the logical sub-block. In addition, the receiver may receive a serialized symbol from the external device, and convert the received symbol into a bit stream. The bit stream may be deserialized to be supplied to the logical sub-block. That is, the physical layer may convert TLPs received from the data link layer into a serialized format, and convert a packet received from the external device into a deserialized format. Also, the physical layer may include logical functions associated with interface initialization and maintenance.

Although the structure of the first PCIe interface 210-1 and the second PCIe interface 210-2 is illustrated in FIG. 3, the structure of the first PCIe interface 210-1 and the second PCIe interface 210-2 may include an arbitrary form such as a quick path interconnect structure, a next generation high performance computing interconnect structure, or another hierarchical structure.

Figure 4:
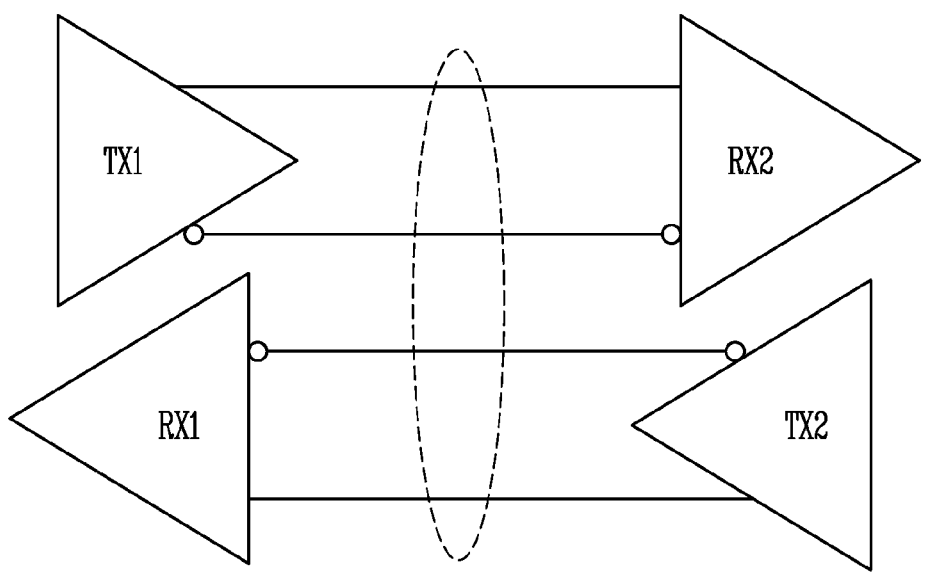
FIG. 4 is a diagram illustrating a transmitter, a receiver, and a lane in accordance with an embodiment of the present disclosure.

FIG. 4 is a diagram illustrating a transmitter, a receiver, and a lane in accordance with an embodiment of the present disclosure.

Referring to FIG. 4, a first transmitter TX1, a second transmitter TX2, a first receiver RX1, and a second receiver RX2 are illustrated. A lane may include a path including differentially driven signal pairs, e.g., a transmission path pair configured for transmission and a reception path pair configured for reception. A PCIe device may include a transmission logic for transmitting data to another PCIe device and a reception logic for receiving data from another PCIe device. For example, the lane may include two transmission paths connected to the first transmitter TX1 and two reception paths connected to the first receiver RX1.

The transmission path may mean an arbitrary path for transmitting data, such as a transmission line, a copper line, an optical line, a wireless communication channel, an infrared communication link, or another communication path. In addition, the reception path may be a path which is implemented identically to the transmission path, but is used for reception.

Connection between two PCIe devices, e.g., the first PCIe device 200-1 and the second PCIe device 200-2 may be designated as a link. The link may support one or more lanes. For example, the link may include a plurality of lanes. In addition, each lane may represent a set of differential signal pairs (one pair for transmission and one pair for reception). The differential signal may mean signal pairs which have the same frequency and the same amplitude but have phases opposite to each other. For example, when a first signal is at a rising edge at which the first signal is toggled from 0 to V+, a second signal may be at a falling edge at which the second signal is toggled from 0 to V−. The PCIe device can use signal integrity, e.g., more satisfactory electrical characteristics such as cross-coupling, voltage overshoot/undershoot, and ringing, by using the differential signal. The PCIe device can more rapidly adjust a transmission frequency. Also, the link may include a plurality of lanes to adjust a bandwidth. For example, the two PCIe devices may form a link including 1 lane, 2 lanes, 4 lanes, 8 lanes, 12 lanes, 32 lanes, 64 lanes, or the like.

Figure 5:
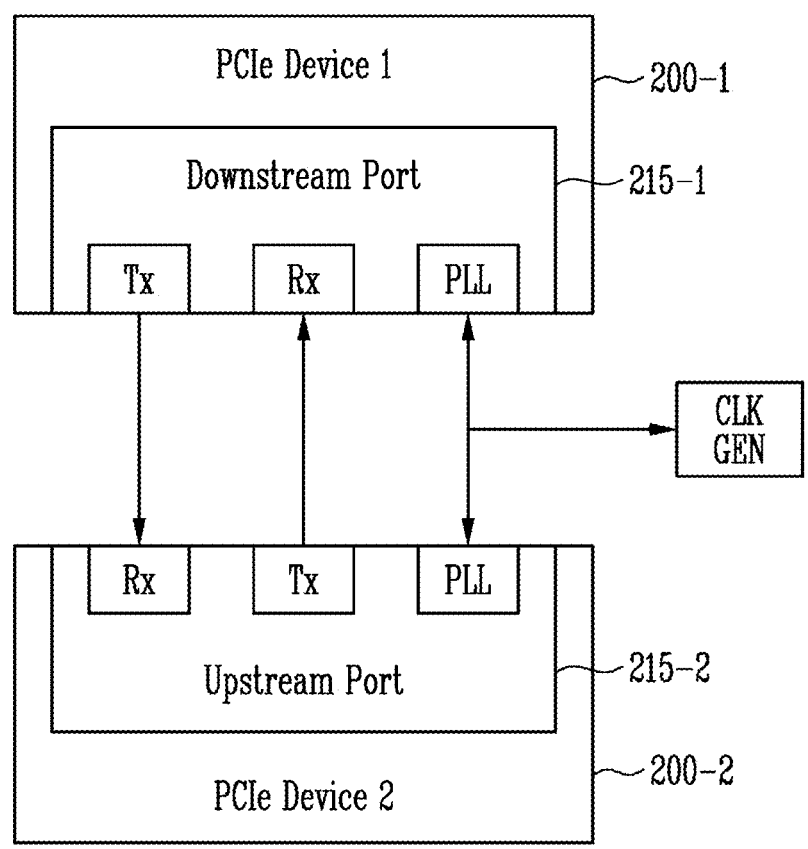
FIG. 5 is a diagram illustrating a port in accordance with an embodiment of the present disclosure.

FIG. 5 is a diagram illustrating a port in accordance with an embodiment of the present disclosure.

Referring to FIG. 5, a downstream port 215-1 and an upstream port 215-2 are illustrated, which are respectively included in a first PCIe device 200-1 and a second PCIe device 200-2.

In an embodiment, the first PCIe device 200-1 may be an upper layer than a layer of the second PCIe device 200-2, and data movement and transmission to an upper layer may be designated as upstream. On the contrary, data movement and transmission to a lower layer may be designated as downstream. For example, referring to FIG. 1, the switch 140 may support routing to the upstream and the downstream. Specifically, the upstream may be routing of a packet or message upstream to a layer toward the root complex 120 from a PCIe endpoint (e.g., 150_1), and the downstream may be routing of a packet or message downstream to a layer toward a PCIe endpoint (e.g., 150_2) from the root complex 120.

In an embodiment, the first PCIe device 200-1 including the downstream port 215-1 may be designated as an "upstream component." The upstream component may represent the root complex 120 or the switch 140, which is shown in FIG. 1. In addition, the second PCIe device 200-2 including the upstream port 215-2 may be designated as a "downstream component." The downstream component may represent one of the switch 140, the PCIe endpoints 150_1 to 150_3, the legacy endpoints 160_1 and 160_2, and the PCIe bridge 170, which are shown in FIG. 1.

Each of the downstream port 215-1 and the upstream port 215-2 may include a transmitter Tx, a receiver Rx, and a phase locked loop (PLL) circuit. The PLL circuit may generate a clock signal to be supplied to the transmitter Tx or the receiver Rx by using a clock signal provided from a clock signal generator CLK GEN. The PLL circuit may generate a clock signal with a changed frequency by multiplying a signal received from the clock signal generator CLK GEN. For example, the PLL circuit may multiply a reference clock signal REFCLK having a frequency of 100 MHz into a clock signal having a frequency of 2.5 GHZ. The transmitter Tx may convert a parallel data signal into a serial data signal by using an output signal of the PLL circuit, and transmit the serial data signal to the external device, e.g., an external PCIe device. The receiver Rx may receive a serial data signal transmitted from the external device, and generate a clock signal for recovering the received serial data signal and a clock signal for converting the recovered serial data signal into a parallel data signal by using the output signal of the PLL circuit. The clock signal generator CLK GEN may generate a reference clock signal REFCLK used for an operation of a PCIe interface. The operation of the PCIe interface may be communication with the external PCIe device.

Figure 6:
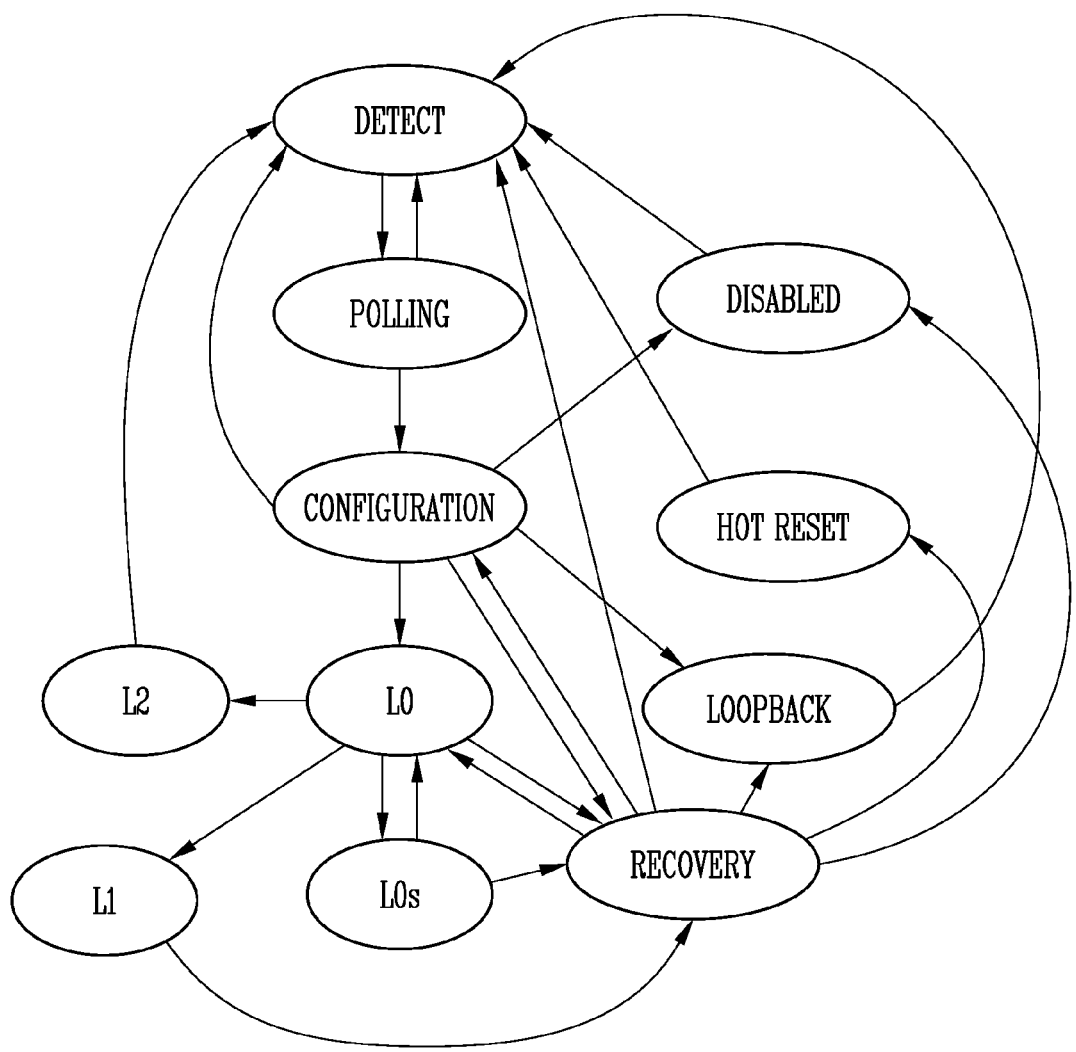
FIG. 6 is a diagram illustrating a link state of the PCIe device in accordance with an embodiment of the present disclosure.

FIG. 6 is a diagram illustrating a link state of the PCIe device in accordance with an embodiment of the present disclosure.

Referring to FIG. 6, link states of the PCIe device include a detect state, a polling state, a configuration state, a hot reset state, a disabled state, an L0 state, and the like.

The detect state is an initialization state after power-on or a reset, and may be a state in which the detect state enters from the following states. For example, the detect state may be a state in which the detect state enters from the configuration state, the hot reset state, the disabled state, an L2 state, a loopback state, and a recovery state. The detect state may reset all logics, all ports, and all registers, and be a phase of detecting a link connected to the PCIe interface. That is, the detect state may be a phase of searching from a physically connected lane.

The polling state may mean a state for distinguishing a lane through which data communication is possible among detected lanes. The polling state may be a phase of synchronizing clocks at both ends of the PCIe interface, checking whether the polarity of the lane is D+ or D−, and checking a data transmission speed which the lane can use. That is, the polling state may be a state for checking polarity inversion. In addition, a link of the polling state may enter into the detect state or the configuration state.

The configuration state may be a state for checking a connection state of a lane. Specifically, the configuration state may be a state for defining a lane width with which data communication is possible. Also, the configuration state may be a state for checking lane inversion. The configuration state may enter from the polling state. Alternatively, the configuration state may enter into the configuration state in lane reduce and lane width up after the configuration state enters into the L0 state.

The recovery state may be a state used for reconfiguration of a link bandwidth. The recovery state may change the link bandwidth of a set link, and reset a bit lock, a symbol lock, and a lane-to-lane de-skew. The recovery state may enter when an error occurs in the L0 state. Subsequently, the recovery state may be changed to the L0 state after the error is recovered in the recovery state. In accordance with an embodiment of the present disclosure, an equalization operation of the link may be performed in the recovery state.

The L0 state may be a normal operational state in which data and control packets can be transmitted and received through a link. Specifically, the L0 state may be an operational state of a physical bus interface through which data and control packets can be transmitted and received. The L0 state may be a fully active state.

An L0s state may be a state which enables the physical bus interface to rapidly enter into a power preservation state and enables the physical bus interface to be recovered without going through any recovery state. The L0s state may be a power saving state. The L0s state may be an idle of standby state of some functions in the interface.

An L1 state may be a power saving state. The L1 state may be a state in which a power saving amount is added as compared with the L0s state. The L1 state may be a low power standby state.

The L2 state may be an active power saving state. Most transmitters and receivers may be shut off. Main power and clocks are not guaranteed, but auxiliary power may be supplied. The L2 state may be a lower power sleep state in which no power is supplied to most functions. The loopback state may be a state used for test and malfunction separation. The loopback state is operated only in units of lanes, and a loopback reception lane is to be selected and configured.

The disabled state may be a state which disables a set link until further notice. The hot reset state may be triggered by only a downstream port. The downstream port may use training sequences (TS) (e.g., TS1 or TS2) to propagate a hot reset. The training sequences (TS) may be aligned sets used for initializing bit alignment, symbol alignment, and physical layer parameter exchange. In this specification, the "training sequences" may be designated as "training sequence ordered sets."

Figure 7:
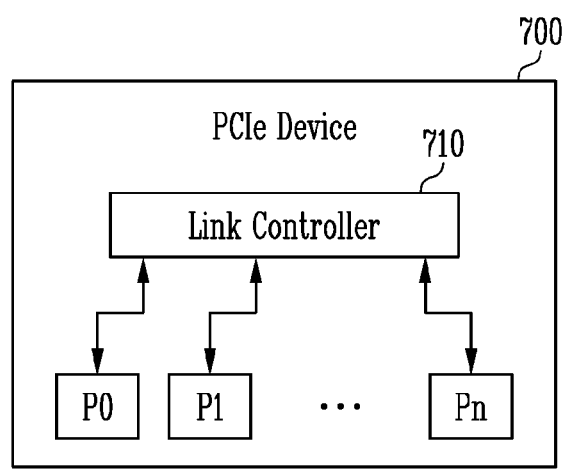
FIG. 7 is a diagram illustrating a PCIe device in accordance with an embodiment of the present disclosure.

FIG. 7 is a diagram illustrating a PCIe device in accordance with an embodiment of the present disclosure.

Referring to FIG. 7, the PCIe device 700 may include a plurality of ports P0 to Pn and a link controller 710.

The plurality of ports P0 to Pn may form a plurality of lanes. For example, as shown in FIG. 4, one port along with a port included in another PCIe device may form one lane.

In an embodiment, each of the plurality of ports P0 to Pn may be a downstream port or an upstream port. For example, when the plurality of ports P0 to Pn are downstream ports, the PCIe device 700 may be an upstream component. Also, when the plurality of ports P0 to Pn are upstream ports, the PCIe device 700 may be a downstream component. Each of the plurality of ports P0 to Pn may include a receiver and a transmitter.

The link controller 710 may set a link. The link may include the plurality of ports P0 to Pn. That is, the link may be formed by the plurality of ports P0 to Pn. For example, the link controller 710 may perform a link setting operation of setting a link. The link setting operation may represent a process of initializing and configuring a link such that the link normally operates. The link setting operation includes a link initialization and training operation according to a PCIe specification.

In an embodiment, the link controller 710 may include a Link Training and Status State Machine (LTSSM). The LTSSM may be a component for performing the link setting operation.

The link controller 710 may perform a link width and lane number negotiation operation. A link width may represent a number of lanes forming a link. For example, the link controller 710 may determine a link width in a process of setting a link. A lane number may represent a number allocated to each lane included in a link. For example, the link controller 710 may negotiate a number allocated to each lane in a process of setting a link, and determine a lane number of each lane according to the negotiation. The determined lane number may be transmitted to another PCIe device, and the another PCIe device may accept the corresponding lane number.

In an embodiment, the link controller 710 may detect a failed lane among a plurality of lanes in a process of setting a link. The failed lane may be a lane which has a state in which the failed lane cannot form the link together with remaining lanes. The remaining lanes are lanes which are not failed lanes, and may include all lanes except the failed lane among the plurality of lanes. For example, when a problem occurs in a transmission path or a reception path, which is included in a lane, the corresponding lane may be a failed lane. The failed lane may not normally operate when data is transmitted. For example, when the state of a link is a detect state, the link controller 710 may detect a failed lane through a link setting operation corresponding to the detect state. The link setting operation corresponding to the detect state is an operation performed to set a link in the detect state, and may include an operation for finding a link at both ends. For example, the both ends may be ports included in different PCIe devices connected to each other through the link. Subsequently, the link controller 710 may perform a link setting operation corresponding to the detect state on remaining lanes except the failed lane among the plurality of lanes. Also, when the state of a link is a polling state, the link controller 710 may detect a failed lane through a link setting operation corresponding to the polling state. The link setting operation corresponding to the polling state is an operation performed to set a link in the polling state, and may include an operation of transmitting/receiving a training sequence ordered set. For example, the link setting operation corresponding to the polling state may include an operation of transmitting/receiving a training sequence ordered set between ports connected through the link. Subsequently, the link controller 710 may perform a link setting operation corresponding to the polling state on remaining lanes except the failed lane among the plurality of lanes.

In an embodiment, the link controller 710 may set a link to have a link width including remaining lanes except the failed lane among the plurality of lanes. For example, when the state of a link is a configuration state, the link controller 710 may perform a link setting operation corresponding to the configuration state on remaining lanes except the failed lane among the plurality of lanes. The link setting operation corresponding to the configuration state may be an operation performed to set a link in the configuration state. For example, the link setting operation corresponding to the configuration state may include an operation of setting a link width, an operation of determining a lane number, a lane to lane de-skew operation, and the like.

For example, the link controller 710 may determine a link number of the link in the configuration state, and determine a lane number of each of remaining lanes except the failed lane among the plurality of lanes. The link controller 710 may determine a lane number of each of the remaining lanes through a lane number negotiation operation. In an embodiment, the link controller 710 may determine a lane number of each of the remaining lanes such that the lane numbers of the remaining lanes sequentially increase or decrease.

In an embodiment, the link controller 710 may provide a link number determined through the plurality of ports P0 to Pn and the determined lane number for each of the remaining lanes to other ports forming a plurality of lanes together with the plurality of ports P0 to Pn. The other ports may be ports included in another PCIe device different from the PCIe device 700. For example, the link controller 710 may provide the other ports with a link number determined by using the training sequence ordered set and the determined lane number of each of the remaining lanes. The other PCIe device may accept the link number and the lane number of each of the remaining lanes.

Figure 8A:
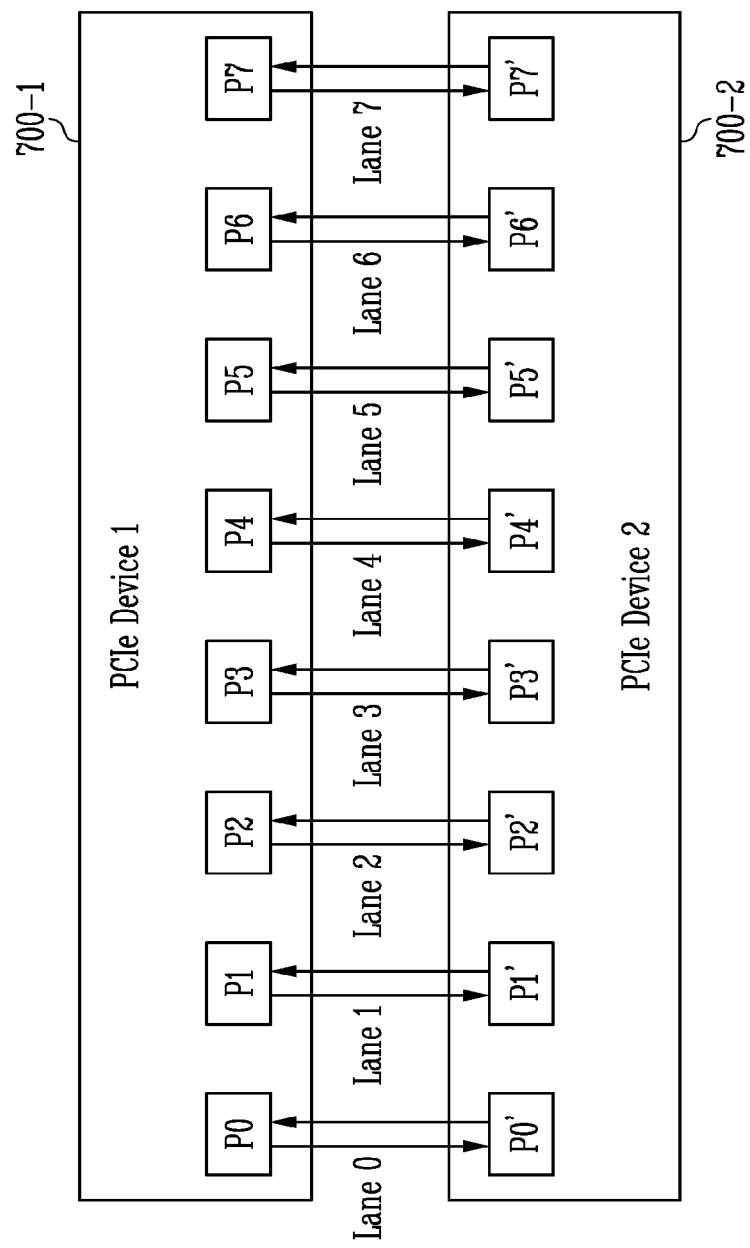
FIGS. 8A and 8B are diagrams illustrating an operation of setting a link in accordance with an embodiment of the present disclosure.
Figure 8B:
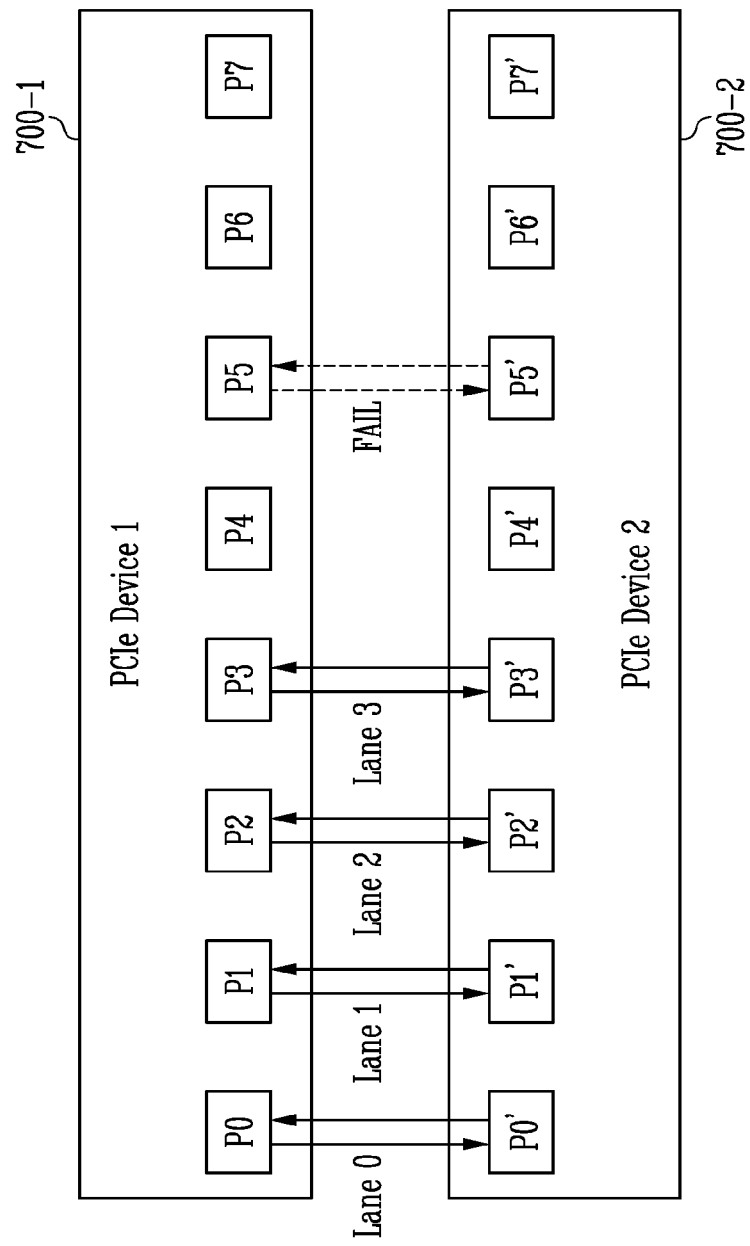

FIGS. 8A and 8B are diagrams illustrating an operation of setting a link in accordance with an embodiment of the present disclosure.

Referring to FIG. 8A, each of a first PCIe device 700-1 and a second PCIe device 700-2 may represent the PCIe device 700. For example, the first PCIe device 700-1 may be a PCIe device including a plurality of downstream ports P0 to P7. In addition, the second PCIe device 700-2 may be a PCIe device including a plurality of upstream ports P0' to P7'. However, this is merely an example. In some embodiments, the ports included in the first PCIe device 700-1 may be upstream ports, and the ports included in the second PCIe device 700-2 may be downstream ports. In some embodiments, the first PCIe device 700-1 may include downstream ports, and the second PCIe device 700-2 may include upstream ports. In addition, although it is illustrated that each of the first PCIe device 700-1 and the second PCIe device 700-2 includes 8 ports, the number of ports may vary in some embodiments.

The plurality of downstream ports P0 to P7 along with the plurality of upstream ports P0' to P7' may form a plurality of lanes. For example, a zeroth downstream port P0 and a zeroth upstream port P0' may form a zeroth lane Lane 0, a first downstream port P1 and a first upstream port P1' may form a first lane Lane 1, a second downstream port P2 and a second upstream port P2' may form a second lane Lane 2, a third downstream port P3 and a third upstream port P3' may form a third lane Lane 3, a fourth downstream port P4 and a fourth upstream port P4' may form a fourth lane Lane 4, a fifth downstream port P5 and a fifth upstream port P5' may form a fifth lane Lane 5, a sixth downstream port P6 and a sixth upstream port P6' may form a sixth lane Lane 6, and a seventh downstream port P7 and a seventh upstream port P7' may form a seventh lane Lane 7. The operation of forming these lanes may be performed through a link width and lane number negotiation operation.

FIG. 8B illustrates a case where the lane between the fifth downstream port P5 and the fifth upstream port P5' is a failed lane while the first PCIe device 700-1 and the second PCIe device 700-2 set a link.

The first PCIe device 700-1 may perform a lane number negotiation operation on the plurality of ports P0 to P7 in an order in which port numbers of the plurality of ports P0 to P7 increase. Therefore, according to the PCIe specification, since the lane between the fifth downstream port P5 and the fifth upstream port P5' is a failed lane, the lane number negotiation operation on the sixth downstream port P6 and the seventh downstream port P7 may not be performed. The lane between the sixth downstream port P6 and the sixth upstream port P6' and the lane between the seventh downstream port P7 and the seventh upstream port P7' may be in an electrical idle state.

In addition, according to the PCIe specification, a link width may be generally determined as any of 1 lane, 2 lanes, 4 lanes, 8 lanes, 12 lanes, 16 lanes, and 32 lanes. Therefore, the first PCIe device 700-1 may set a link to have a link width including 4 lanes Lane 0 to Lane 3. The link may be formed with only 4 lanes Lane 0 to Lane 3. Although the lane between the fourth downstream port P4 and the fourth upstream port P4' is not a failed lane, the lane between the fourth downstream port P4 and the fourth upstream port P4' may be in an electric idle state.

Since the lane between the fourth downstream port P4 and the fourth upstream port P4', the lane between the sixth downstream port P6 and the sixth upstream port P6', and the lane between the seventh downstream port P7 and the seventh upstream port P7' are not used, the performance of the PCIe device may be deteriorated. Accordingly, a plan for forming a link by using an operation except a failed lane or allowable lanes is required.

Figure 9:
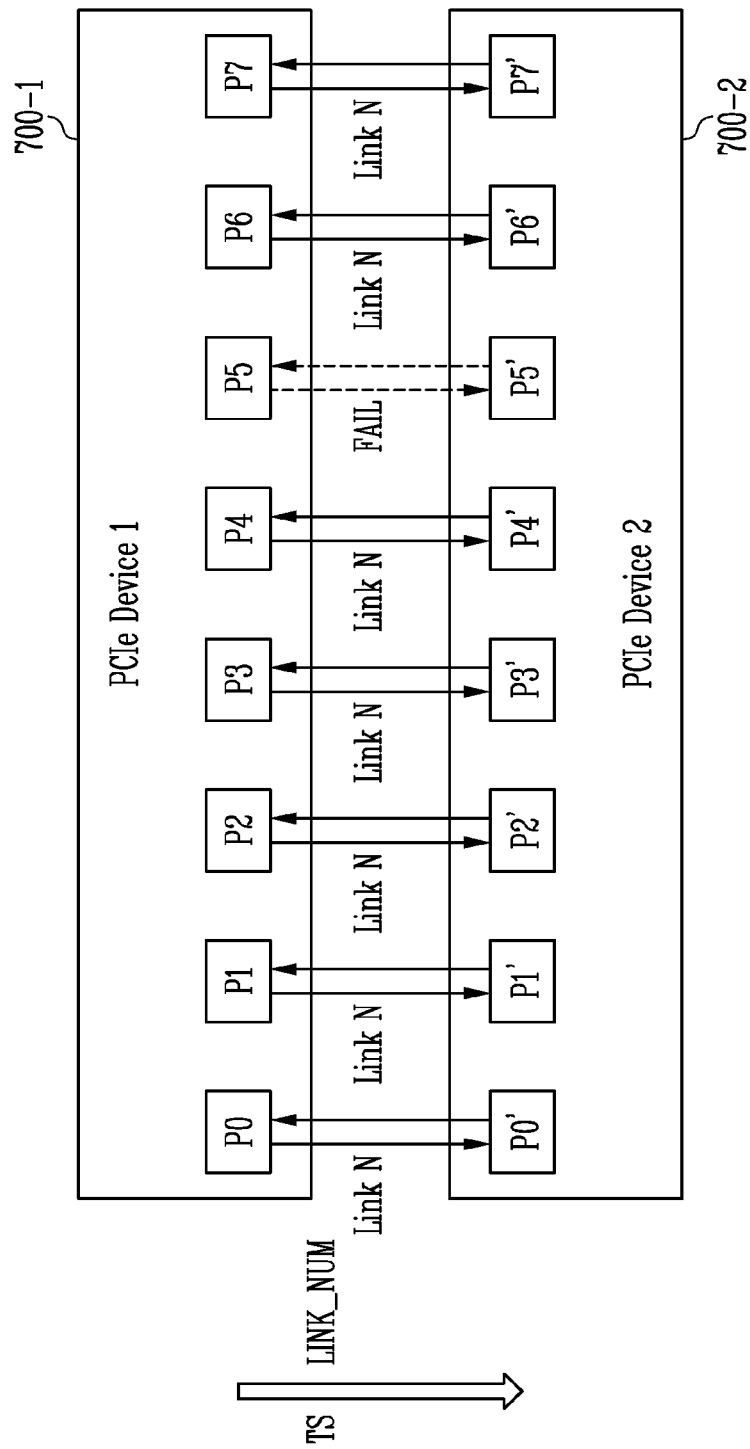
FIG. 9 is a diagram illustrating an operation of determining a link number in accordance with an embodiment of the present disclosure.

FIG. 9 is a diagram illustrating an operation of determining a link number in accordance with an embodiment of the present disclosure.

Referring to FIG. 9, the first PCIe device 700-1 may detect a failed lane through a link setting operation in a detect state or a polling state.

The first PCIe device 700-1 may determine a link number Link_N in a configuration state. The first PCIe device 700-1 may provide upstream ports P0' to P4', P6', and P7' with a training sequence ordered set TS including information LINK_NUM on a link number through the other downstream ports P0 to P4, P6, and P7 except the fifth downstream port P5 connected to the failed lane. The second PCIe device 700-2 may receive the training sequence ordered set TS through the upstream ports P0' to P4', P6', and P7', and accept the link number Link_N.

Figure 10:
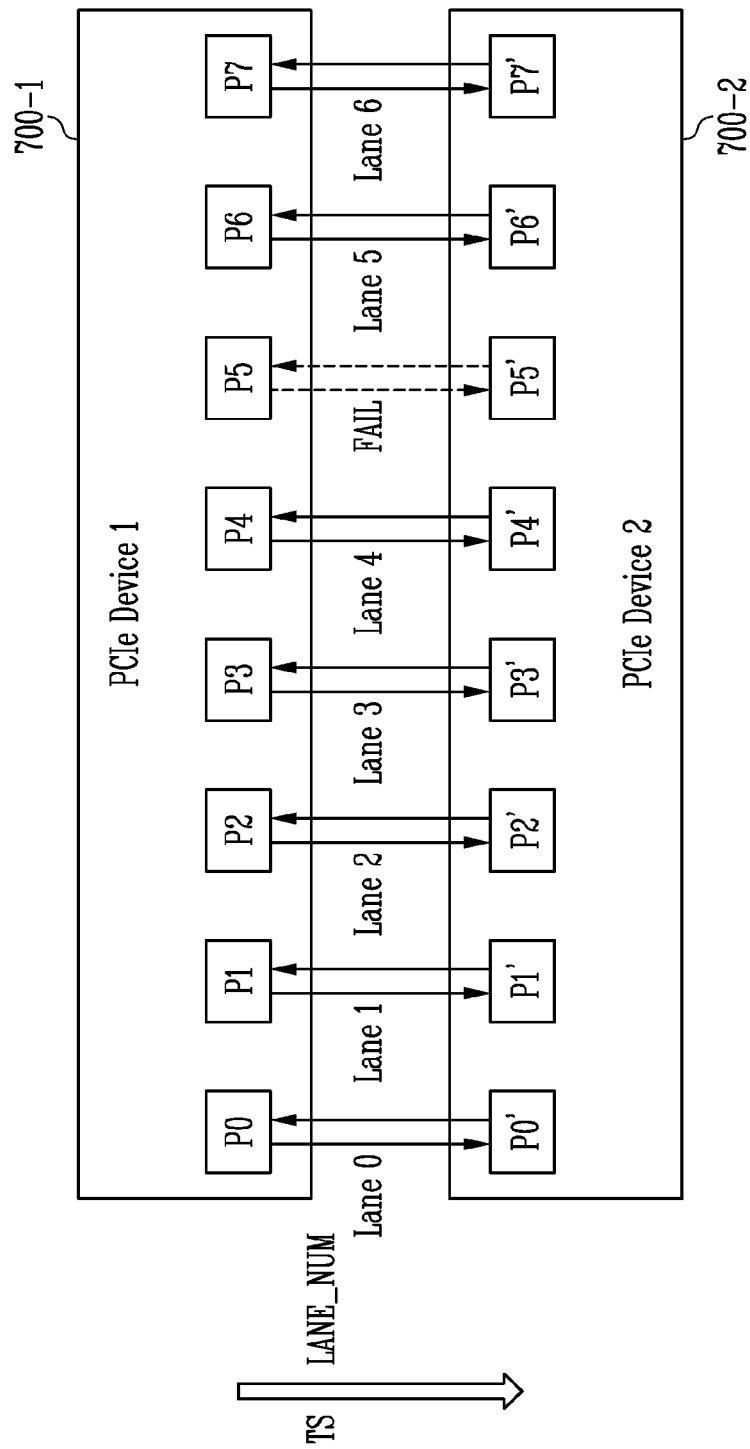
FIG. 10 is a diagram illustrating an operation of determining a link number in accordance with an embodiment of the present disclosure.

FIG. 10 is a diagram illustrating an operation of determining a link number in accordance with an embodiment of the present disclosure.

Referring to FIG. 10, the first PCIe device 700-1 may detect a failed lane through a link setting operation in a detect state and a polling state.

The first PCIe device 700-1 may determine a lane number of each of remaining lanes except the failed lane among the plurality of lanes in a configuration state. The first PCIe device 700-1 may determine a lane number for each of the remaining lanes such that the lane numbers of the remaining lanes sequentially increase or decrease. For example, the first PCIe device 700-1 may sequentially increase the lane number from the lane between the zeroth downstream port P0 and the zeroth upstream port P0' to the lane between the seventh downstream port P7 and the seventh upstream port P7', except the failed lane. Accordingly, the lane between the zeroth downstream port P0 and the zeroth upstream port P0' may be determined as a zeroth lane Lane 0. The lane between the first downstream port P1 and the first upstream port P1' may be determined as a first lane Lane 1. The lane between the second downstream port P2 and the second upstream port P2' may be determined as a second lane Lane 2. The lane between the third downstream port P3 and the third upstream port P3' may be determined as a third lane Lane 3. The lane between the fourth downstream port P4 and the fourth upstream port P4' may be determined as a fourth lane Lane 4. The lane between the sixth downstream port P6 and the sixth upstream port P6' may be determined as a fifth lane Lane 5. The lane between the seventh downstream port P7 and the seventh upstream port P7' may be determined as a sixth lane Lane 6. Meanwhile, for convenience of description, an operation in which the lane numbers of the remaining lanes sequentially increase has been described in the example shown in FIG. 10. However, an operation in which the lane numbers of the remaining lanes sequentially decrease may also be equally applied.

Also, the first PCIe device 700-1 may provide upstream ports P0' to P4', P6', and P7' with a training sequence ordered set TS including information LANE_NUM on lane numbers through the other downstream ports P0 to P4, P6, and P7 except the fifth downstream port P5 connected to the failed lane. For example, the zeroth downstream port P0 may provide the zeroth upstream port P0' with information on the zeroth lane Lane 0 through the training sequence ordered set TS. The first downstream port P1 may provide the first upstream port P1' with information on the first lane Lane 1 through the training sequence ordered set TS. The second downstream port P2 may provide the second upstream port P2' with information on the second lane Lane 2 through the training sequence ordered set TS. The third downstream port P3 may provide the third upstream port P3' with information on the third lane Lane 3 through the training sequence ordered set TS. The fourth downstream port P4 may provide the fourth upstream port P4' with information on the fourth lane Lane 4 through the training sequence ordered set TS. The sixth downstream port P6 may provide the sixth upstream port P6' with information on the fifth lane Lane 5 through the training sequence ordered set TS. The seventh downstream port P7 may provide the seventh upstream port P7' with information on the sixth lane Lane 6 through the training sequence ordered set TS.

The second PCIe device 700-2 may receive the training sequence ordered set TS through the upstream ports P0' to P4', P6', and P7', and accept the lane numbers Lane 0 to Lane 6.

Thus, in accordance with an embodiment of the present disclosure, a link may be set to have a link width including remaining lanes except the failed lane among the plurality of lanes. Therefore, the link may be formed by using an activated operation or allowable lanes. In another embodiment, a link is not formed by using an operation or allowable lanes, but may be formed by using only a portion of the operation or allowable lanes. In an example, the second PCIe device 700-2 may accept lane numbers Lane 0 to Lane 5 by using an operation or 6 lanes among 7 allowable lanes.

Figure 11:
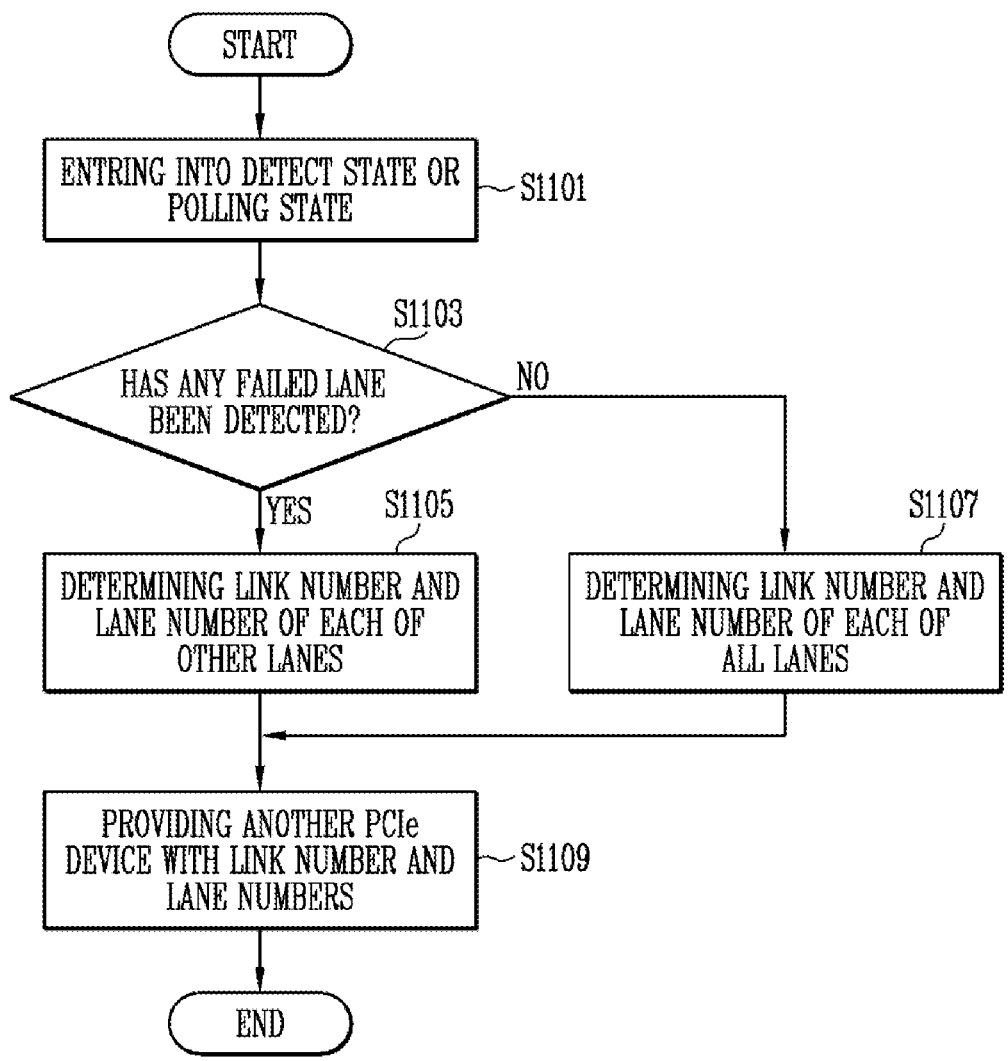
FIG. 11 is a flowchart illustrating an operating method of a PCIe device in accordance with an embodiment of the present disclosure.

FIG. 11 is a flowchart illustrating an operating method of a PCIe device in accordance with an embodiment of the present disclosure.

The operating method shown in FIG. 11 may be performed by, for example, the PCIe device 700 shown in FIG. 7.

Referring to FIG. 11, in operation S1101, the PCIe device 700 may enter into a detect state or a polling state during a link setting operation.

In operation S1103, the PCIe device 700 may determine whether any failed lane among a plurality of lanes has been detected. For example, when the state of a link is a detect state, the PCIe device 700 may detect a failed lane through a link setting operation corresponding to the detect state. Also, when the state of a link is a polling state, the PCIe device 700 may detect a failed lane through a link setting operation corresponding to the polling state.

When the failed lane is detected based on a determination result in the operation S1103, in operation S1105, the PCIe device 700 may determine a link number and a lane number of each of the remaining lanes except the failed lane among the plurality of lanes. For example, the PCIe device 700 may determine a lane number for each of the remaining lanes such that the lane numbers of the remaining lanes sequentially increase or decrease in a configuration state. Also, in accordance with an embodiment of the present disclosure, the PCIe device 700 may allocate a non-sequential lane number to each of the remaining lanes in the configuration state. In this specification, the "non-sequential lane number" may mean a lane number with respect to all cases except the lane number determined such that the lane numbers of the remaining lanes except the failed lane sequentially increase or decrease. That is, when lane numbers of at least some of other lanes do not sequentially increase or decrease even though lane numbers of some physically adjacent lanes among all lane numbers sequentially increase or decrease, such a lane number may be designated as a non-sequential lane number. That is, the "non-sequential lane number" may refer to a discontinuously allocated lane number with respect to lanes located physically adjacent to each other.

When any failed lane is not detected based on a determination result in the operation S1103, in operation S1107, the PCIe device 700 may determine a link number and lane numbers of all lanes. In accordance with an embodiment of the present disclosure, the PCIe device 700 may allocate a non-sequential lane number to each of all lanes in the configuration state.

In operation S1109, the PCIe device 700 may provide another PCIe device with the determined link number and the determined lane numbers. The other PCIe device may accept the determined link number and the determined lane numbers.

Figure 12:
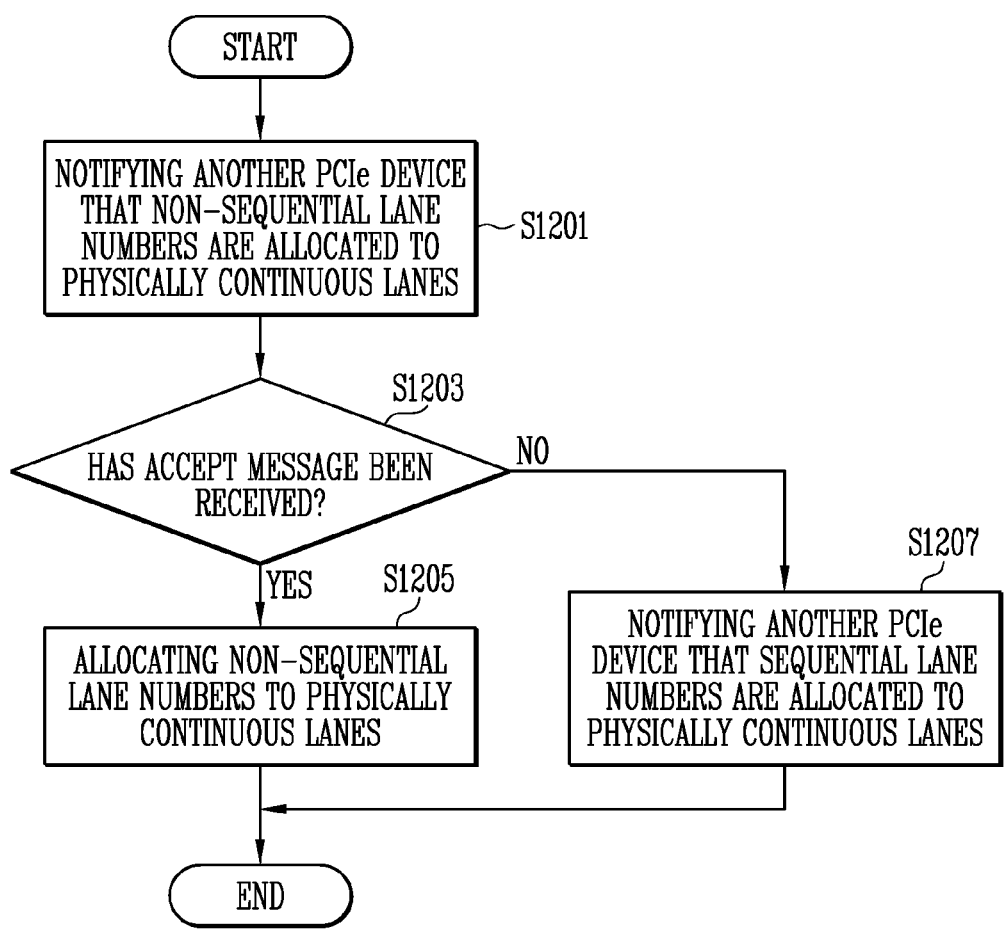
FIG. 12 is a flowchart illustrating operation S1109 shown in FIG. 11 in accordance with an embodiment of the present disclosure.
Figure 13:
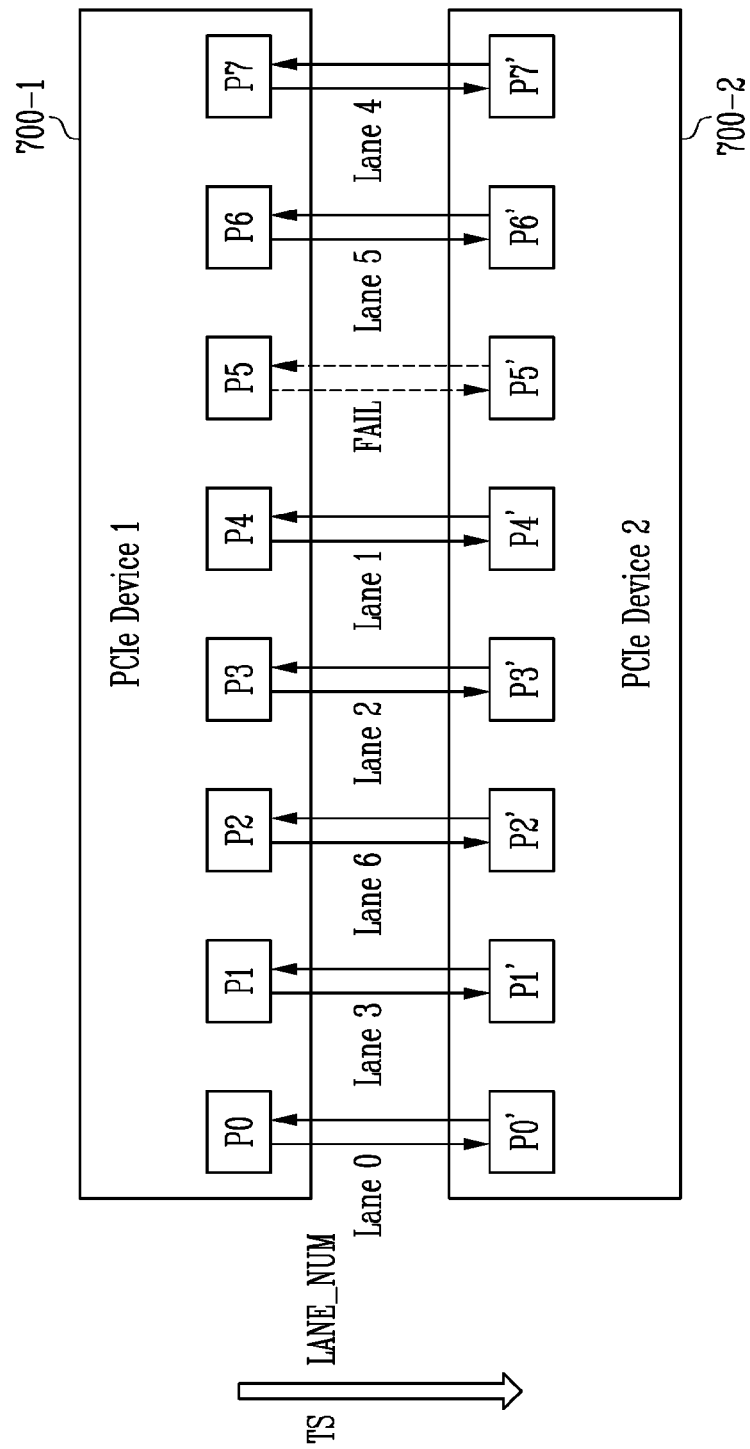
FIG. 13 is a diagram illustrating lane numbers determined according to operation S1105 shown in FIG. 11 in accordance with an embodiment of the present disclosure.

FIG. 12 is a flowchart illustrating an operation S1109 shown in FIG. 11 in accordance with an embodiment of the present disclosure. More specifically, FIG. 12 illustrates an embodiment of the operation S1109 performed after the link number and the lane number of each of the remaining lanes are non-sequentially determined in the operation S1105 after the failed lane is detected in the operation S1103. FIG. 13 is a diagram illustrating lane numbers determined according to the operation S1105 shown in FIG. 11 in accordance with an embodiment of the present disclosure.

Referring to FIG. 12, the operation S1109 shown in FIG. 11 may include operation S1201 of notifying another PCIe device that non-sequential lane numbers are allocated to physically continuous lanes, operation S1203 of determining whether an accept message has been received from the another PCIe device, operation S1205 of allocating the non-sequential lane numbers to the physically continuous lanes when the accept message is received from the another PCIe device (S1203: YES), and operation S1207 of notifying the other PCIe device that sequential lane numbers are allocated to the physically continuous lanes. Hereinafter, FIG. 12 will be described with reference to FIG. 13.

In the operation S1105 shown in FIG. 11, the first PCIe device 700-1 may be to allocate non-sequential lane numbers to physically continuous lanes. For reasons of use or for various other reasons, it is necessary to allocate the non-sequential lane numbers to the physically continuous lanes. That is, in the operation S1105 shown in FIG. 11, the first PCIe device 700-1 may determine that the non-sequential lane numbers are to be allocated to the physically continuous lanes.

Referring to FIG. 13, an example is illustrated, in which non-sequential lane numbers are allocated to physically continuous lanes. The first PCIe device 700-1 may notify the second PCIe device 700-2 that the non-sequential lane numbers are allocated to the physically continuous lanes (S1201). The first PCIe device 700-1 may include downstream ports P0 to P7, and the second PCIe device 700-2 may include upstream ports P0' to P7'. More specifically, the first PCIe device 700-1 may provide upstream ports P0' to P4', P6', and P7' with a training sequence ordered set TS including information LANE_NUM on lane numbers through the other downstream ports P0 to P4, P6, and P7 except a fifth downstream port P5 connected to a failed lane. For example, a zeroth downstream port P0 may provide information on a zeroth lane Lane 0 to a zeroth upstream port P0' through the training sequence ordered set TS. A first downstream port P1 may provide information on a first lane Lane 1 to a first upstream port P1' through the training sequence ordered set TS. A second downstream port P2 may provide information on a second lane Lane 2 to a second upstream port P2' through the training sequence ordered set TS. A third downstream port P3 may provide information on a third lane Lane 3 to a third upstream port P3' through the training sequence ordered set TS. A fourth downstream port P4 may provide information on a fourth lane Lane 4 to a fourth upstream port P4' through the training sequence ordered set TS. A sixth downstream port P6 may provide information on a fifth lane Lane 5 to a sixth upstream port P6' through the training sequence ordered set TS. A seventh downstream port P7 may provide information on a sixth lane Lane 6 to a seventh upstream port P7' through the training sequence ordered set TS.

The second PCIe device 700-2 may receive the training sequence ordered set TS through the upstream ports P0' to P4', P6', and P7', and accept the lane numbers Lane 0 to Lane 6. The second PCIe device 700-2 may use some reserved bits of the training sequence ordered set TS transferred to the first PCIe device 700-1 as bits representing whether lane numbers are to be accepted. More specifically, the second PCIe device 700-2 may use some bits of the training sequence ordered set TS transferred to the first PCIe device 700-1 as a message representing whether non-sequential lane numbers are to be accepted.

When a specific bit of the training sequence ordered set TS transferred to the first PCIe device 700-1 after the operation S1201 is "1," the first PCIe device 700-1 may determine this as an accept message. On the other hand, when the specific bit of the training sequence ordered set TS transferred to the first PCIe device 700-1 after the operation S1201 is "0", the first PCIe device 700-1 may determine this as a reject message. Alternatively, any accept message may not be received from the second PCIe device 700-2 for a specific time after the operation S1201 (time-out). This is a case where the second PCIe device 700-2 does not transfer any explicit reject message, but may also correspond to the case where any accept message is not received.

When an accept message is received from the second PCIe device 700-2 (S1203: YES), the first PCIe device 700-1 may allocate non-sequential lane numbers to physically continuous lanes (operation S1205). Referring to FIG. 13, a lane between the zeroth downstream port P0 and the zeroth upstream port P0' may be determined as the zeroth lane Lane 0. A lane between the first downstream port P1 and the first upstream port P1' may be determined as the third lane Lane 3. A lane between the second downstream port P2 and the second upstream port P2' may be determined as the sixth lane Lane 6. A lane between the third downstream port P3 and the third upstream port P3' may be determined as the second lane Lane 2. A lane between the fourth downstream port P4 and the fourth upstream port P4' may be determined as the first lane Lane 1. A lane between a fifth downstream port P5 and a fifth upstream port P5' is a failed lane, and may not be used. A lane between the sixth downstream port P6 and the sixth upstream port P6' may be determined as the fifth lane Lane 5. A lane between the seventh downstream port P7 and the seventh upstream port P7' may be determined as the fourth lane Lane 4.

When any accept message is not received from the second PCIe device 700-2 (S1203: NO), the first PCIe device 700-1 may notify another PCIe device that sequential lane numbers are to be allocated to the physical continuous lanes (S1207). The sequential lane numbers may be determined as shown in FIG. 10. That is, the lane between the zeroth downstream port P0 and the zeroth upstream port P0' may be determined as the zeroth lane Lane 0. The lane between the first downstream port P1 and the first upstream port P1' may be determined as the first lane Lane 1. The lane between the second downstream port P2 and the second upstream port P2' may be determined as the second lane Lane 2. The lane between the third downstream port P3 and the third upstream port P3' may be determined as the third lane Lane 3. The lane between the fourth downstream port P4 and the fourth upstream port P4' may be determined as the fourth lane Lane 4. The lane between the sixth downstream port P6 and the sixth upstream port P6' may be determined as the fifth lane Lane 5. The lane between the seventh downstream port P7 and the seventh upstream port P7' may be determined as the sixth lane Lane 6. Through FIGS. 12 and 13, an embodiment of the operation 1109 performed after the operation 1105 of determining lane numbers when the failed lane is detected (S1103: YES) has been described. However, the present disclosure is not limited thereto, and the embodiment shown in FIG. 12 may be applied to the operation S1109 after the operation S1107 of determining lane numbers when any failed lane is not detected (S1103: NO).

Figure 14A:
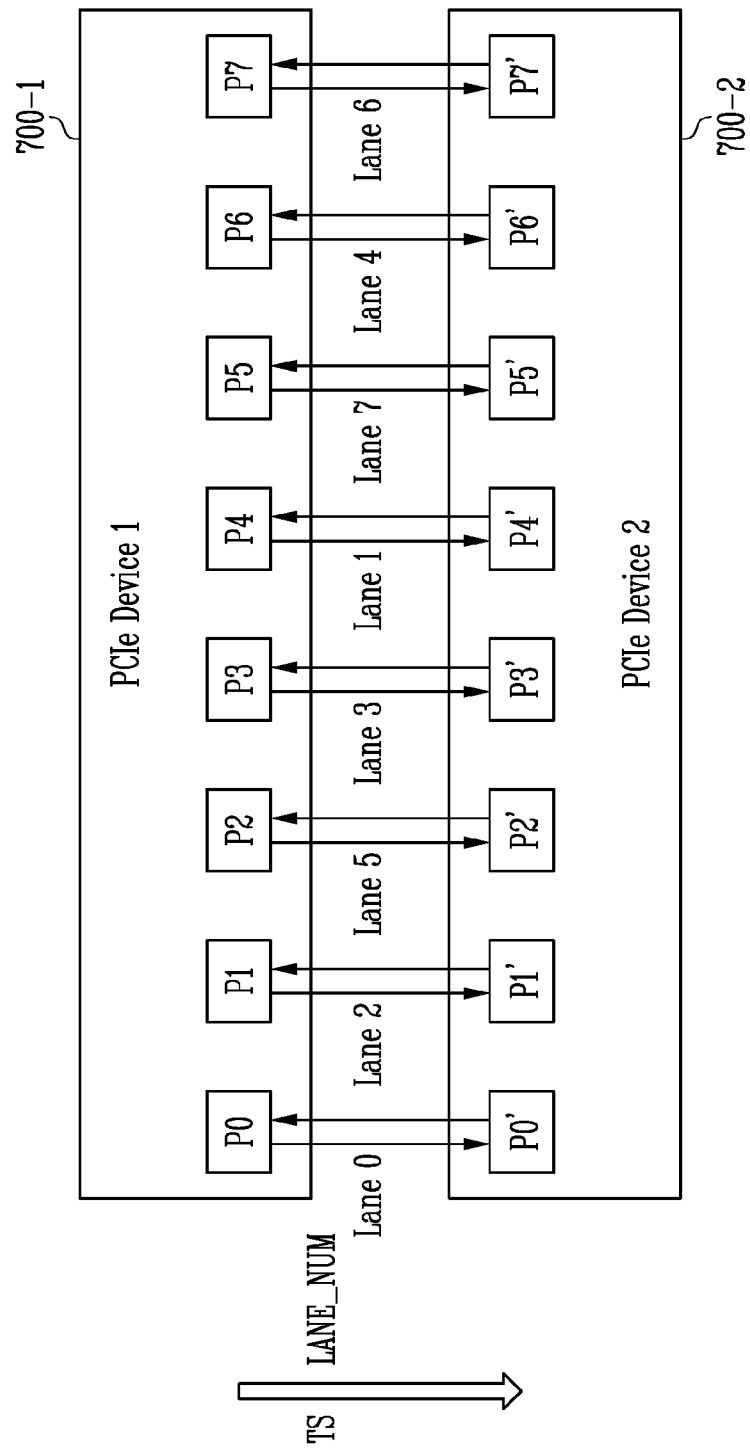
FIG. 14A is a diagram illustrating non-sequential lane numbers determined when any failed lane is not detected in accordance with an embodiment of the present disclosure.
Figure 14B:
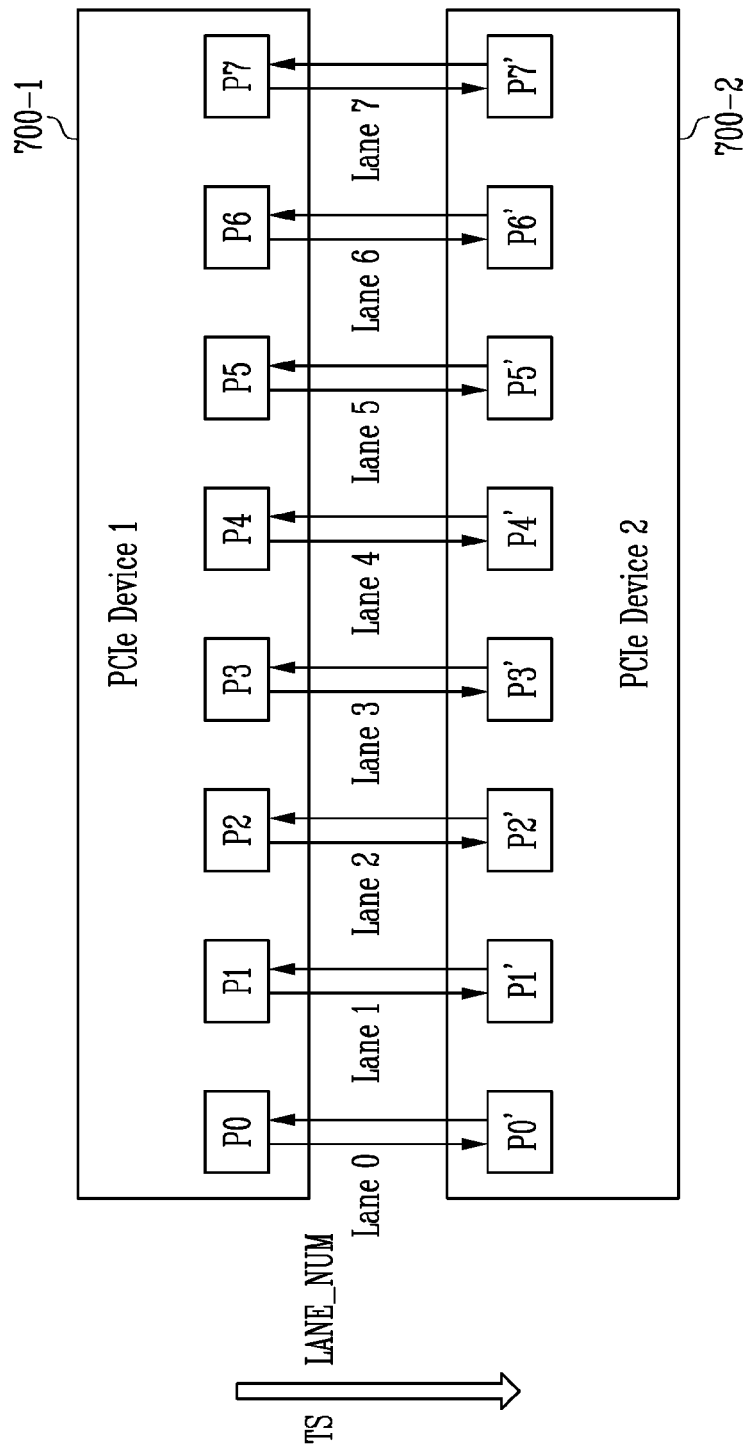
FIG. 14B is a diagram illustrating sequential lane numbers determined when any failed lane is not detected in accordance with an embodiment of the present disclosure.

FIG. 14A is a diagram illustrating an embodiment of non-sequential lane numbers determined when any failed lane is not detected in accordance with an embodiment of the present disclosure. FIG. 14B is a diagram illustrating an embodiment of sequential lane numbers determined when any failed lane is not detected in accordance with an embodiment of the present disclosure.

For example, after any failed lane is not detected in the operation S1103, in the operation S1107, non-sequential lane numbers may be determined as shown in FIG. 14A. Subsequently, in the operation S1201 shown in FIG. 12, which is a detailed operation of the operation S1109, the PCIe device 700-1 may notify the second PCIe device 700-2 of lane numbers as shown in FIG. 14. When an accept message is received from the second PCIe device 700-2 (S1203: YES), the first PCIe device 700-1 may allocate non-sequential lane numbers to the physically continuous lanes (operation S1205). Referring to FIG. 14A, the lane between the zeroth downstream port P0 and the zeroth upstream port P0' may be determined as the zeroth lane Lane 0. The lane between the first downstream port P1 and the first upstream port P1' may be determined as the second lane Lane 2. The lane between the second downstream port P2 and the second upstream port P2' may be determined as the fifth lane Lane 5. The lane between the third downstream port P3 and the third upstream port P3' may be determined as the third lane Lane 3. The lane between the fourth downstream port P4 and the fourth upstream port P4' may be determined as the first lane Lane 1. The lane between the fifth downstream port P5 and the fifth upstream port P5' may be determined as a seventh lane Lane 7. The lane between the sixth downstream port P6 and the sixth upstream port P6' may be determined as the fourth lane Lane 4. The lane between the seventh downstream port P7 and the seventh upstream port P7' may be determined as the sixth lane Lane 6.

When any accept message is not received from the second PCIe device 700-2 (S1203: NO), the first PCIe device 700-1 may notify another PCIe device that sequential lane numbers are to be allocated to the physically continuous lanes (operation S1207). Sequential lane numbers may be determined as shown in FIG. 14B. That is, the lane between the zeroth downstream port P0 and the zeroth upstream port P0' may be determined as the zeroth lane Lane 0. The lane between the first downstream port P1 and the first upstream port P1' may be determined as the first lane Lane 1. The lane between the second downstream port P2 and the second upstream port P2' may be determined as the second lane Lane 2. The lane between the third downstream port P3 and the third upstream port P3' may be determined as the third lane Lane 3. The lane between the fourth downstream port P4 and the fourth upstream port P4' may be determined as the fourth lane Lane 4. The lane between the fifth downstream port P5 and the fifth upstream port P5' may be determined as the fifth Lane 5. The lane between the sixth downstream port P6 and the sixth upstream port P6' may be determined as the sixth lane Lane 6. The lane between the seventh downstream port P7 and the seventh upstream port P7' may be determined as the seventh lane Lane 7.

Through FIGS. 11 to 14B, the method of allocating non-sequential lane numbers under the leadership of the first PCIe device 700-1 including the downstream ports P0 to P7 has been illustrated. However, the present disclosure is not limited thereto, and non-sequential lane numbers may be allocated under the leadership of the second PCIe device 700-2 including the upstream ports P0' to P7'. Hereinafter, this will be described with reference to FIG. 15.

Figure 15:
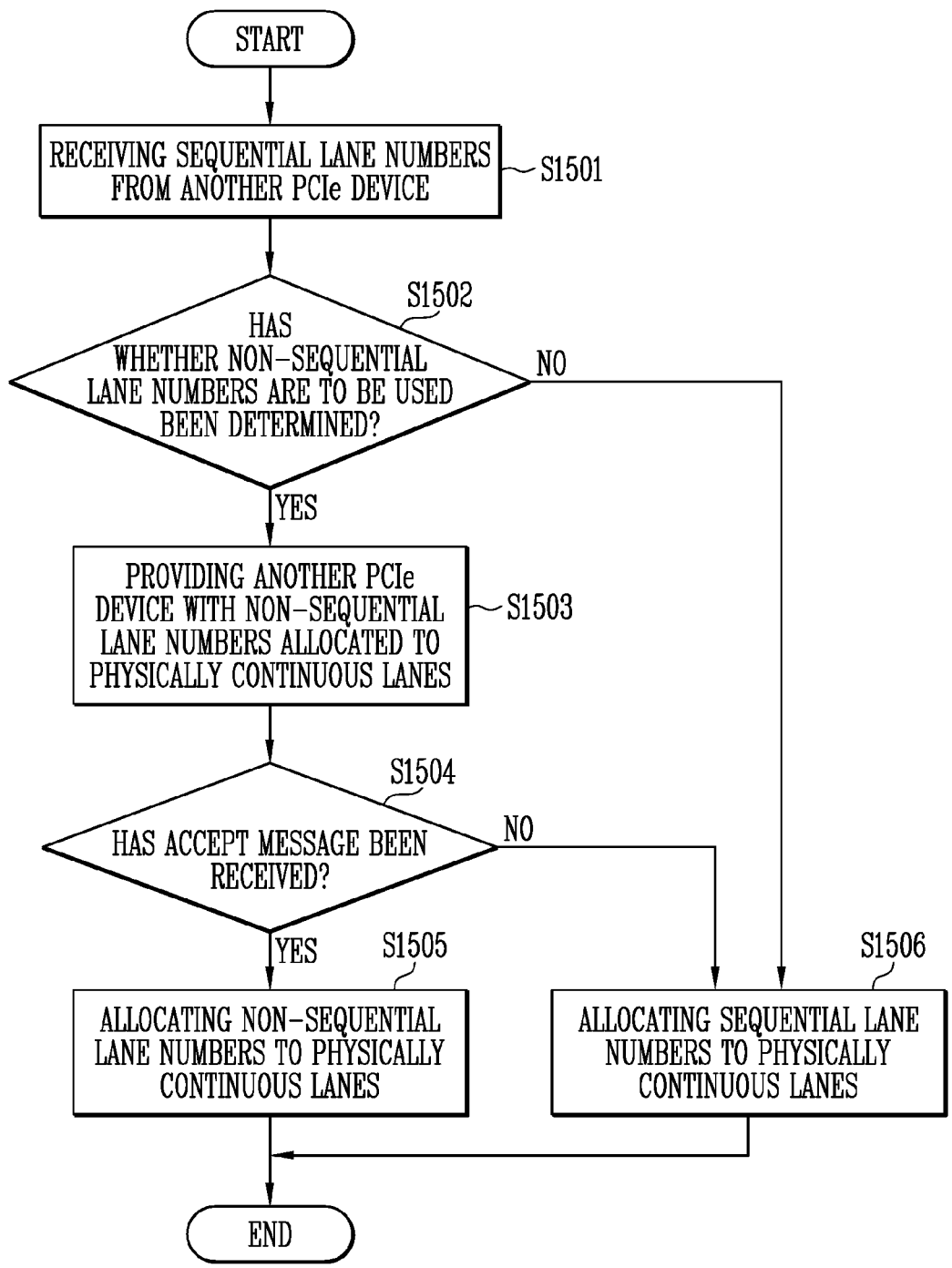
FIG. 15 is a flowchart illustrating a method in which a PCIe device at an upstream port side determines non-sequential lane numbers in accordance with an embodiment of the present disclosure.

FIG. 15 is a flowchart illustrating a method in which a PCIe device at an upstream port side determines non-sequential lane numbers n accordance with an embodiment of the present disclosure.

Referring to FIG. 15, an operating method of the PCIe device in accordance with the embodiment of the present disclosure may include operation S1501 of receiving sequential lane numbers from another PCIe device, operation S1502 of determining whether non-sequential lane numbers are to be used, operation S1503 of providing the another PCIe device with non-sequential lane numbers allocated to physically continuous lanes, operation S1504 of determining whether an accept message has been received, operation S1505 of allocating the non-sequential lane numbers to the physically continuous lanes, and operation S1506 of allocating sequential lane numbers to the physically continuous lanes.

In the operation S1501, the second PCIe device 700-2 including the upstream ports P0' to P7' may receive information on sequential lane numbers from the first PCIe device 700-1 including the downstream ports P0 to P7. The second PCIe device 700-2 may determine to use the sequential lane numbers received from the first PCIe device 700-1 as they are (S1502: NO). The second PCIe device 700-2 may allocate sequential lane numbers to physically continuous lanes, based on the sequential lane numbers received from the first PCIe device 700-1 (S1506).

Alternatively, after the operation S1501, the second PCIe device 700-2 may determine to use non-sequential lane numbers, unlike the sequential lane numbers received from the first PCIe device 700-1 (S1502: YES). The second PCIe device 700-2 may provide the first PCIe device 700-1 with non-sequential lane numbers allocated to the physically continuous lanes (S1503). The second PCIe device 700-2 may provide the first PCIe device 700-1 with information on the above-described non-sequential lane numbers through a training sequence ordered set TS.

As a result obtained by performing the operation S1503, the first PCIe device 700-1 may receive the information on the non-sequential lane numbers. When the first PCIe device 700-1 determines that the received non-sequential lane numbers will be used as they are, the first PCIe device 700-1 may transfer an accept message to the second PCIe device 700-2. The first PCIe device 700-1 may use some reserved bits of a training sequence ordered set TS transferred to the second PCIe device 700-2 as bits representing whether lane numbers are to be accepted. More specifically, the first PCIe device 700-1 may use some bits of a training sequence ordered set TS transferred to the first PCIe device 700-1 as a message representing whether non-sequential lane numbers are to be accepted.

On the other hand, when the first PCIe device 700-1 does not use the received non-sequential lane numbers but determines to use the sequential lane numbers transferred in the initial operation S1501, the first PCIe device 700-1 may transfer a reject message to the second PCIe device 700-2. In another embodiment, the first PCIe device 700-1 may not transfer any message to the second PCIe device 700-2.

In the operation S1504, the second PCIe device 700-2 may determine whether the accept message has been received from the first PCIe device 700-1. For example, when a specific bit of the training sequence ordered set TS which the first PCIe device 700-1 transfers to the second PCIe device 700-2 after the operation S1503 is "1," the second PCIe device 700-2 may determine this as the accept message. On the other hand, when the specific bit of the training sequence ordered set TS which the first PCIe device 700-1 transfers to the second PCIe device 700-2 after the operation S1503 is "0," the second PCIe device may determine this as the reject message. Alternatively, any accept message may not be received from the PCIe device 700-1 for a specific time after the operation S1503 (time-out). This is a case where the first PCIe device 700-1 does not transfer any explicit reject message, but may also correspond to the case where any accept message is not received.

When an accept message is received from the first PCIe device 700-1 (S1504: YES), the second PCIe device 700-2 may allocate non-sequential lane numbers to the physically continuous lanes (operation S1505). When any accept message is not received from the first PCIe device 700-1 (S1504:

NO), the second PCIe device 700-2 may allocate sequential lane numbers to the physically continuous lanes (operation S1506).

In accordance with an embodiment of the present disclosure, there can be provided a PCIe device for allocating lane numbers such that discontinuous lane numbers are allocated to lanes located adjacent to each other in a link setting operation, and a computing system including the PCIe device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Furthermore, the embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A Peripheral Component Interconnect express (PCIe) device communicating with an external device, the PCIe device comprising:
a plurality of ports together with other ports included in the external device forming a plurality of lanes; and
a link controller configured to set a link including the plurality of lanes to allocate:
a first lane number to a first lane formed by a first port of the plurality of ports and a second port of the other ports among the plurality of lanes, and
a second lane number, which is non-sequential to the first lane number, to a second lane adjacent to the first lane and formed by a third port adjacent to the first port of the plurality of ports and a fourth port adjacent to the second port of the other ports among the plurality of lanes.

2. The PCIe device of claim 1, wherein the link controller includes a Link Training and Status State Machine (LTSSM) configured to set the link.

3. The PCIe device of claim 1, wherein the link controller is further configured to detect, when a state of the link is in a detect state, a failed lane among the plurality of lanes, and perform a link setting operation corresponding to the detect state on remaining lanes except the failed lane among the plurality of lanes.

4. The PCIe device of claim 1, wherein the link controller is further configured to detect, when a state of the link is a polling state, a failed lane among the plurality of lanes, and perform a link setting operation corresponding to the polling state on remaining lanes except the failed lane among the plurality of lanes.

5. The PCIe device of claim 1, wherein the link controller is further configured to perform, when a state of the link is a configuration state, a link setting operation corresponding to the configuration state on the plurality of lanes.

6. The PCIe device of claim 1, wherein the link controller is further configured to determine a lane number of each of the plurality of lanes through a lane number negotiation operation.

7. The PCIe device of claim 6, wherein the link controller is further configured to provide, through the plurality of ports, non-sequential lane numbers of the plurality of lanes to the other ports.

8. The PCIe device of claim 7,
wherein the link controller is further configured to provide, through the plurality of ports, the other ports with a determined link number, and
wherein the link controller provides the other ports with the determined link number and the non-sequential lane numbers of the plurality of lanes by using a training sequence ordered set.

9. The PCIe device of claim 7, wherein the plurality of ports are downstream ports and the other ports are upstream ports.

10. The PCIe device of claim 9, wherein the link controller allocates the non-sequential lane numbers to the plurality of lanes when an accept message is received from the other ports after the non-sequential lane numbers are provided to the other ports.

11. The PCIe device of claim 9, wherein the link controller is further configured to allocate sequential lane numbers to the plurality of lanes when any accept message is not received from the other ports after the non-sequential lane numbers are provided to the other ports.

12. A computing system comprising:
a link including a plurality of lanes;
a first Peripheral Component Interconnect express (PCIe) device including a plurality of downstream ports; and
a second PCIe device including a plurality of upstream ports which form, together with the plurality of downstream ports, the plurality of lanes, and configured to transmit/receive data to/from the first PCIe device through the link,
wherein the first PCIe device is configured to set the link to allocate:
a first lane number to a first lane formed by a first downstream port of the plurality of downstream ports and a first upstream port of the plurality of upstream ports among the plurality of lanes, and
a second lane number, which is non-sequential to the first lane number, to a second lane adjacent to the first lane and formed by a second downstream port adjacent to the first downstream port of the plurality of downstream ports and a second upstream port adjacent to the first upstream port of the plurality of upstream ports among the plurality of lanes.

13. The computing system of claim 12, wherein the first PCIe device is further configured to provide non-sequential lane numbers of the plurality of lanes to the plurality of upstream ports through the plurality of downstream ports.

14. The computing system of claim 13,
wherein the first PCIe device is further configured to provide the plurality of upstream ports with a determined link number, and
wherein the first PCIe device provides the plurality of upstream ports with the determined link number and the non-sequential lane numbers by using a training sequence ordered set, and
allocates the non-sequential lane numbers to the plurality of lanes based on an accept message received from the second PCIe device.

15. The computing system of claim 14, wherein the first PCIe device is further configured to set the link to allocate sequential lane numbers to the plurality of lanes when the first PCIe device does not receive any accept message from the second PCIe device after the first PCIe device provides the plurality of upstream ports with the determined link number and the non-sequential lane number.

16. A computing system comprising:
a link including a plurality of lanes;
a first Peripheral Component Interconnect express (PCIe) device including a plurality of downstream ports; and
a second PCIe device including a plurality of upstream ports which form, together with the plurality of downstream ports, the plurality of lanes, and configured to transmit/receive data to/from the first PCIe device through the link,
wherein the first PCIe device is configured to provide the second PCIe device with sequential lane numbers allocated to the plurality of lanes,
wherein the second PCIe device is further configured to provide the first PCIe device with non-sequential lane numbers allocated to the plurality of lanes, and
wherein the non-sequential lane numbers include:
a first lane number allocated to a first lane formed by a first downstream port of the plurality of downstream ports and a first upstream port of the plurality of upstream ports among the plurality of lanes, and
a second lane number, which is non-sequential to the first lane number, allocated to a second lane adjacent to the first lane and formed by a second downstream port adjacent to the first downstream port of the plurality of downstream ports and a second upstream port adjacent to the first upstream port of the plurality of upstream ports among the plurality of lanes.

17. The computing system of claim 16,
wherein the first PCIe device provides the sequential lane numbers to the plurality of upstream ports through the plurality of downstream ports, and
wherein the second PCIe device provides the non-sequential lane numbers to the plurality of downstream ports through the plurality of upstream ports.

18. The computing system of claim 17, wherein the first PCIe device is further configured to provide an accept message to the second PCIe device in response to reception of the non-sequential lane numbers, and
allocate the non-sequential lane numbers to the plurality of lanes.

19. The computing system of claim 17, wherein the first PCIe device is further configured to provide a reject message to the second PCIe device in response to reception of the non-sequential lane numbers, and
retain the sequential lane numbers allocated to the plurality of lanes.

20. The computing system of claim 17, wherein the second PCIe device is further configured to allocate the sequential lane numbers to the plurality of lanes when the second PCIe does not receive any accept message from the first PCIe device within a predetermined period from a time at which the second PCIe device provides the non-sequential lane numbers to the first PCIe device.

* * * * *